United States Patent
Ochiai et al.

(10) Patent No.: US 11,529,766 B2
(45) Date of Patent: Dec. 20, 2022

(54) HOLLOW MOLDED ARTICLE AND METHOD OF PRODUCING THE SAME

(71) Applicant: Toray Industries, Inc., Tokyo (JP)

(72) Inventors: Shinichiro Ochiai, Nagoya (JP); Shota Suzuki, Nagoya (JP); Sadayuki Kobayashi, Nagoya (JP)

(73) Assignee: Toray Industries, Inc., Tokyo (JP)

(*) Notice: Subject to any disclaimer, the term of this patent is extended or adjusted under 35 U.S.C. 154(b) by 625 days.

(21) Appl. No.: 16/332,242

(22) PCT Filed: Aug. 21, 2017

(86) PCT No.: PCT/JP2017/029789
§ 371 (c)(1),
(2) Date: Mar. 11, 2019

(87) PCT Pub. No.: WO2018/051733
PCT Pub. Date: Mar. 22, 2018

(65) Prior Publication Data
US 2019/0232572 A1    Aug. 1, 2019

(30) Foreign Application Priority Data

Sep. 13, 2016  (JP) .............................. JP2016-178368
Sep. 13, 2016  (JP) .............................. JP2016-178369
(Continued)

(51) Int. Cl.
*B29C 65/00*    (2006.01)
*F17C 1/16*    (2006.01)
(Continued)

(52) U.S. Cl.
CPC .............. *B29C 66/71* (2013.01); *B29C 45/00* (2013.01); *B29C 65/02* (2013.01); *F17C 1/16* (2013.01);
(Continued)

(58) Field of Classification Search
CPC ......... B29C 65/02; B29C 65/72; B29C 45/00; B29C 45/0001; B29C 66/71;
(Continued)

(56) References Cited

U.S. PATENT DOCUMENTS

2002/0028889 A1*  3/2002  Nakamura .............. C08L 77/02
                                                              525/432
2004/0173618 A1*  9/2004  Suzuki ...................... F17C 1/16
                                                              220/581
(Continued)

FOREIGN PATENT DOCUMENTS

JP           06-271762 A    9/1994
JP         2003-119375 A    4/2003
(Continued)

OTHER PUBLICATIONS

Frantz, Jeffrey When Vibration Welding is the Best Choice, Plastics Decorating, available online at https://plasticsdecorating.com/articles/2016/when-vibration-welding-is-the-best-choice/ on Feb. 5, 2016 (Year: 2016).*

(Continued)

*Primary Examiner* — Lee E Sanderson
(74) *Attorney, Agent, or Firm* — DLA Piper LLP (US)

(57) ABSTRACT

A hollow molded article having a joining site where two or more split objects are welded by plastic welding and comes into contact with pressurized hydrogen, wherein an average spherulite size in a portion which is 500 μm deep inside from a surface of the hollow molded article is 20 μm or less, and a tensile strength of a test piece containing the joining site of the hollow molded article is 80% or more based on a tensile strength of a test piece not containing the joining site of the hollow molded article.

8 Claims, 1 Drawing Sheet

(a)

Elapsed time from the start of the temperature drop (seconds)

(b)

Elapsed time from the start of the temperature drop (seconds)

(30) Foreign Application Priority Data

Sep. 13, 2016 (JP) .............................. JP2016-178370
Mar. 23, 2017 (JP) .............................. JP2017-056923

(51) Int. Cl.
  *B29C 45/00* (2006.01)
  *B29C 65/02* (2006.01)
  *B29K 77/00* (2006.01)
  *B29L 31/00* (2006.01)

(52) U.S. Cl.
  CPC .. *B29K 2077/00* (2013.01); *B29K 2995/0012* (2013.01); *B29K 2995/0041* (2013.01); *B29K 2995/0094* (2013.01); *B29L 2031/7172* (2013.01); *F17C 2203/0604* (2013.01); *F17C 2203/0663* (2013.01); *F17C 2203/0675* (2013.01); *F17C 2209/219* (2013.01); *F17C 2209/2118* (2013.01); *F17C 2209/2154* (2013.01); *F17C 2209/221* (2013.01); *F17C 2209/232* (2013.01); *F17C 2221/012* (2013.01); *F17C 2223/0123* (2013.01); *F17C 2223/036* (2013.01); *F17C 2260/011* (2013.01); *F17C 2260/036* (2013.01); *F17C 2270/0184* (2013.01); *Y02E 60/32* (2013.01)

(58) Field of Classification Search
  CPC .... F17C 11/005; F17C 1/16; F17C 2223/036; F17C 2260/11; F17C 2209/232; F17C 2203/0604; F17C 2209/219; F17C 2209/221; B29L 2031/7156; B29L 2031/7172; B29K 2995/0041; Y02E 60/32

USPC ...... 428/35.7; 220/560.11, 581–592; 206/0.6
See application file for complete search history.

(56) References Cited

U.S. PATENT DOCUMENTS

| | | | |
|---|---|---|---|
| 2009/0203845 A1 | 8/2009 | Fukui et al. | |
| 2010/0126385 A1* | 5/2010 | Heinrichs | C11C 5/002 |
| | | | 106/270 |
| 2013/0150515 A1 | 6/2013 | Mao et al. | |
| 2014/0034654 A1 | 2/2014 | Dullaert et al. | |
| 2017/0029620 A1* | 2/2017 | Sato | F17C 13/04 |
| 2017/0343158 A1* | 11/2017 | Kato | F17C 1/06 |

FOREIGN PATENT DOCUMENTS

| | | |
|---|---|---|
| JP | 2005-254757 A | 9/2005 |
| JP | 2005-279963 A | 10/2005 |
| JP | 2009-191871 A | 8/2009 |
| JP | 2014-501818 A | 1/2014 |
| JP | 5935956 B1 | 6/2016 |
| JP | 2016-135833 A | 7/2016 |
| WO | 2013/085970 A1 | 6/2013 |
| WO | 2016/136025 A1 | 9/2016 |

OTHER PUBLICATIONS

The Extended European Search Report dated Mar. 27, 2020, of counterpart European Application No. 17850639.0.

\* cited by examiner

Elapsed time from the start of the temperature drop (seconds)

Elapsed time from the start of the temperature drop (seconds)

HOLLOW MOLDED ARTICLE AND METHOD OF PRODUCING THE SAME

TECHNICAL FIELD

This disclosure relates to a hollow molded article having a welded portion and comes into contact with pressurized hydrogen. More specifically, this disclosure relates to a hollow molded article having a welded portion and a controlled specific spherulite size and is used effectively by virtue of its characteristics that the tensile strength at the welded portion is excellent and cracks in the welded portion can be prevented even when the filling of pressurized hydrogen and pressure release are repeated.

BACKGROUND

In recent years, in response to the exhaustion of petroleum fuel and the demand for the reduction of harmful gas emissions, fuel cell electric vehicles equipped with a fuel cell that generates electricity by reacting electrochemically hydrogen with oxygen in the air and which supply electricity generated by the fuel cell to a motor and use the electricity as a driving force have attracted attention. As a pressurized hydrogen tank installed in vehicles, a resin tank reinforced with a carbon fiber reinforced resin on the outside of the resin liner has been studied. However, since hydrogen has a small molecular size, it permeates through the resin more easily than natural gas having a relatively large molecular size, and the amount of pressurized hydrogen accumulated in the resin is larger than that of hydrogen at normal pressure. Therefore, conventional resin tanks had a problem of deformation or damage of the tank when the pressurized hydrogen was repeatedly filled and the pressure was repeatedly released.

As a hydrogen tank liner excellent in gas barrier property and in impact resistance even at a low temperature, for example, a hydrogen tank liner composed of a polyamide resin composition containing a polyamide 6, a copolymerized polyamide, and an impact modifier has been studied (see, for example, JP 2009-191871 A).

However, in the hydrogen tank liner disclosed in JP 871, the average spherulite size of the polyamide resin composition is larger than 20 μm, and the tensile strength in the welded portion is low. As a result, permeation of a hydrogen gas from the welded portion and the solution of the hydrogen gas in the resin are likely to occur, causing a problem of cracks in the welded portion of the hydrogen tank liner when the pressurized hydrogen filling and pressure release are repeated.

Considering the above problem, it could be helpful to provide a hollow molded article excellent in tensile strength of the welded portion and prevents cracks in a welded portion even when the filling of pressurized hydrogen and pressure release are repeated.

SUMMARY

We thus provide:

A hollow molded article having a joining site where two or more split objects are welded by plastic welding and comes into contact with pressurized hydrogen, wherein the average spherulite size in a portion which is 500 μm deep inside from the surface of the hollow molded article is 20 μm or less, and the tensile strength of a test piece containing the joining site of the hollow molded article is 80% or more based on the tensile strength of a test piece not containing the joining site of the hollow molded article.

A method of producing a hollow molded article that comes into contact with pressurized hydrogen, comprising a step of forming a hollow molded article by welding two or more split objects by a welding method selected from hot plate welding, infrared-ray welding, and infrared-ray/vibration welding in which vibration welding is carried out after a welded portion is warmed by infrared rays, wherein the average spherulite size in a portion which is 500 μm deep inside from the surface of the hollow molded article is 20 μm or less, and the tensile strength of a test piece containing a joining site of the hollow molded article is 80% or more based on the tensile strength of a test piece not containing a joining site of the hollow molded article.

By virtue of the characteristics that the tensile strength in the welded portion is excellent and that cracks in the welded portion can be prevented even when the filling of pressurized hydrogen and pressure release are repeated, the hollow molded article can be used effectively as a hollow molded article which has a welded portion and that comes into contact with pressurized hydrogen.

DESCRIPTION OF THE REFERENCE NUMERALS

Figure 1:
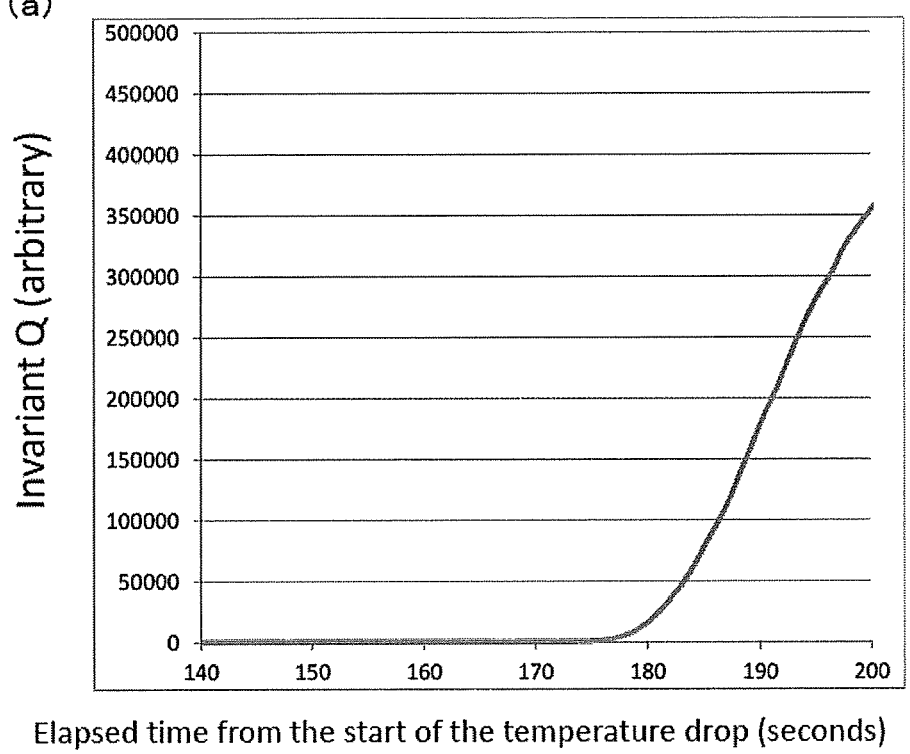
FIGS. 1(a) and (b) show a graph that shows results of the measurement of the invariant Q of the polyamide 6 resin used in Example 1.
Figure 1:
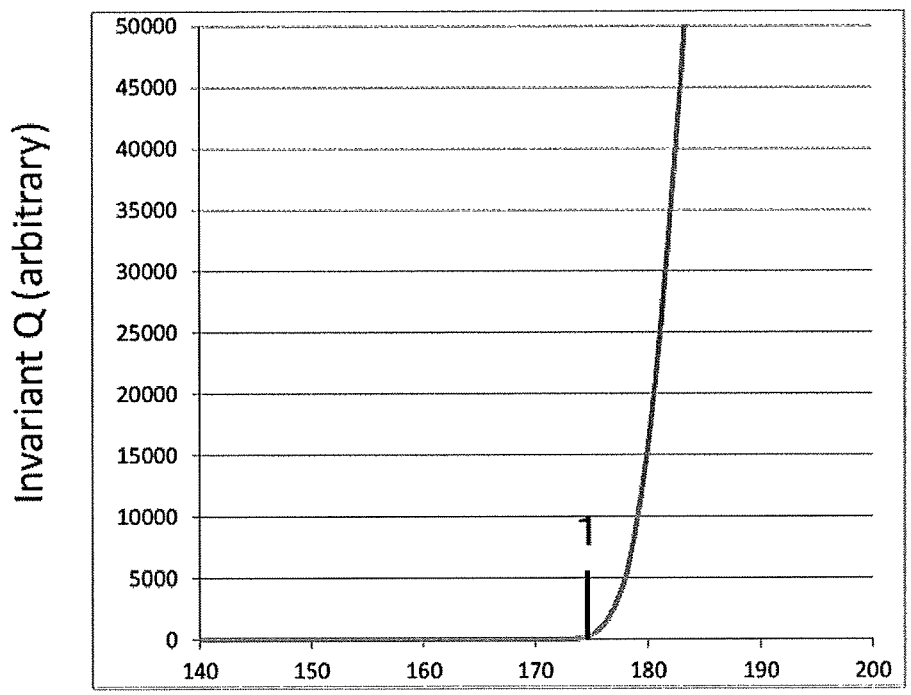

1 Rise time of the invariant Q

DETAILED DESCRIPTION

Our articles and methods will be described in detail below.

The hollow molded article having a joining site where two or more split objects are welded by plastic welding (hereinafter, sometimes refers to "hollow molded article") is a hollow molded article that comes into contact with pressurized hydrogen, in which the average spherulite size in a portion which is 500 μm deep inside from the surface of the hollow molded article is 20 μm or less, and the tensile strength of a test piece containing the joining site of the hollow molded article is 80% or more based on the tensile strength of a test piece not containing a joining site welded by plastic welding.

The hollow molded article is preferably composed of a resin material and is preferably composed of a resin composition containing a resin component and other additives. The resin component is preferably a thermoplastic resin.

The average spherulite size in a portion which is 500 μm deep inside from the surface of the hollow molded article is 20 μm or less. The hollow molded article in which the average spherulite size in a portion which is 500 μm deep inside from the surface of the hollow molded article is larger than 20 μm cannot prevent permeation of a hydrogen gas and the solution of hydrogen in the resin and, as a result, repeated filling of pressurized hydrogen and repeated pressure release are likely to cause defects.

Moreover, the average spherulite size in a portion which is 500 μm deep inside from the surface of the hollow molded article is preferably 15 μm or less, and more preferably 10 μm or less because the resulting hollow molded article can prevent defects even when the filling of more pressurized hydrogen and pressure release are repeated. The lower limit of the average spherulite size is not limited, but usually about 0.01 µm. The average spherulite size is determined as follows: an ultrathin section is cut out from a site which is 500 µm deep inside from the surface of the hollow molded article, and the section is observed with a polarizing microscope or a transmission electron microscope to take photos of spherulites, and the number average value of the diameters of the spherulites is calculated by an image analysis device or the like.

The method of adjusting the average spherulite size in the portion which is 500 µm deep inside from the surface of the hollow molded article to 20 µm or less is not particularly limited as long as such a hollow molded article can be obtained. Examples of such methods include a method in which split objects are molded while vibration energy is imparted, a method in which split objects are molded by a cooling and heating cycle process in which a resin is shaped in a mold whose surface is cooled and then the mold surface is heated, a method in which a crystal nucleating agent is added to a polyamide resin, a method in which a polyamide resin composition formed by blending two specific polyamide resins is used and the like. Among them, the hollow molded article is preferably a hollow molded article composed of a polyamide resin composition, and a method of using a polyamide resin composition formed by adding a crystal nucleating agent to a polyamide resin and a method of using a polyamide resin composition formed by blending two specific polyamide resins are preferably applied.

The hollow molded article has a joining site where two or more split objects are welded by plastic welding, and the tensile strength of a test piece containing the joining site (hereinafter sometimes referred to as the tensile strength of the joining site) is 80% or more based on the tensile strength of a test piece not containing a joining site welded by plastic welding (hereinafter sometimes referred to as tensile strength of a site other than the joining site). When the tensile strength of the site welded by plastic welding is lower than 80% with respect to the tensile strength of a site other than the site welded by plastic welding, the permeation and solution of a hydrogen gas from the welded portion occur easily. As a result, when pressurized hydrogen is repeatedly filled and pressure is repeatedly released, cracks tend to occur in the welded portion.

The tensile strength of a test piece containing a joining site where two or more split objects are welded by plastic welding is, with respect to the tensile strength of a test piece not containing a site welded by plastic welding, preferably 85% or more, more preferably 90% or more, and further preferably 95% or more because the resulting hollow molded article can prevent further the permeation of a hydrogen gas from the welded portion and the solution of a hydrogen gas in the resin and prevent cracks in the welded portion even when the filling of pressurized hydrogen and pressure release are repeated. The method of measuring the tensile strength of the joining site where two or more split objects are welded by plastic welding and the tensile strength of a site other than the joining site is explained below. To measure the tensile strength of the joining site where two or more split objects are welded by plastic welding, a rectangular test piece is cut out from the hollow molded article. A test piece with a short side of 10 mm is prepared such that the joining site welded by plastic welding is positioned at the center in the direction of the long side and perpendicularly to the direction of the long side of the test piece. To measure the tensile strength of a site other than the joining site by plastic welding, a rectangular test piece not containing a site welded by plastic welding and having a short side of 10 mm is prepared such that a tensile test on the hollow molded article can be performed in the same tensile direction as in the tensile test of a test piece of the hollow molded article containing the joining site welded by plastic welding. After humidity adjustment under conditions of 23° C./50% RH for 30 minutes, these test pieces can be measured for the tensile strength at a tensile speed of 10 mm/min and confirmed.

The thickness of the hollow molded article is not particularly limited, but is preferably 1 mm to 5 mm. In addition, when the thickness of the hollow molded article is 1 mm to 5 mm, the tensile strength of the joining site and the tensile strength of a site other than the joining site are values measured using a test piece cut out from the hollow molded article having the thickness.

The method of adjusting such a tensile strength of the joining site where two or more split objects are welded by plastic welding to 80% or more with respect to the tensile strength of a site other than the site welded by plastic welding is not particularly limited as long as such a hollow molded article can be obtained. Such a tensile strength can be obtained by welding the two or more split objects in a plastic welding method selected from hot plate welding, infrared-ray welding and infrared-ray/vibration welding in which vibration welding is carried out after a welded portion is warmed by infrared rays. In particular, a plastic welding method selected from infrared-ray welding and infrared-ray/vibration welding in which vibration welding is carried out after a welded portion is warmed by infrared rays is preferably used.

The ratio of the average spherulite size in a portion which is 700 µm deep inside from the surface of the hollow molded article to the average spherulite size in a portion which is 200 µm deep inside from the surface of the hollow molded article ((the average spherulite size in a portion which is 700 µm deep inside from the surface of the hollow molded article)/(the average spherulite size in a portion which is 200 µm deep inside from the surface of the hollow molded article)) is preferably 1 or more and 2 or less. When the ratio of the average spherulite size in a portion which is 700 µm deep inside from the surface of the hollow molded article to the average spherulite size in a portion which is 200 µm deep inside from the surface of the hollow molded article is smaller than 1, a hydrogen gas is easily dissolved inside the hollow molded article, and when the filling of pressurized hydrogen and pressure release are repeated, defects are likely to occur. On the other hand, when the ratio of the average spherulite size in a portion which is 700 µm deep inside from the surface of the hollow molded article to the average spherulite size in a portion which is 200 µm deep inside from the surface of the hollow molded article is greater than 2, the permeation and a solution of a hydrogen gas occurs easily. As a result, when pressurized hydrogen is repeatedly filled and pressure is repeatedly released, defects are likely to occur. The average spherulite size in a portion which is 700 µm deep inside from the surface of the hollow molded article is not particularly limited but preferably 0.01 µm or more and 30 µm or less. The average spherulite size in a portion which is 200 µm deep inside from the surface of the hollow molded article is not particularly limited but preferably 0.01 µm or more and 20 µm or less.

The ratio of the average spherulite size in a portion which is 700 µm deep inside from the surface of the hollow molded article to the average spherulite size in a portion which is 200 µm deep inside from the surface of the hollow molded article is preferably 1 or more and 1.8 or less and more preferably 1 or more and 1.6 or less because the resulting hollow molded article can prevent further the permeation and solution of a hydrogen gas and also prevent the defects even when the filling of pressurized hydrogen and pressure release are repeated. The ratio of the average spherulite size in a portion which is 700 μm deep inside from the surface of the hollow molded article to the average spherulite size in a portion which is 200 μm deep inside from the surface of the hollow molded article can be measured in the following method. An ultrathin section is cut out from a site which is 700 μm deep inside from the surface of the hollow molded article, and the section is observed with a polarizing microscope or a transmission electron microscope to take photos of spherulites, and the number average value of the diameters of the spherulites is calculated by an image analysis device or the like. Then, another ultrathin section is cut out from a portion which is 200 μm deep inside from the surface of the hollow molded article, and the section was observed with a polarizing microscope or a transmission electron microscope to take photos of spherulites, and the number average value of the diameters of the spherulites is calculated by an image analysis device or the like. From these values, the ratio of the average spherulite size in a portion which is 700 μm deep inside from the surface of the hollow molded article to the average spherulite size in a portion which is 200 μm deep inside from the surface of the hollow molded article can be calculated.

In the hollow molded article in which the ratio of the average spherulite size in a portion which is 700 μm deep inside from the surface of the hollow molded article to the average spherulite size in a portion which is 200 μm deep inside from the surface of the hollow molded article is 1 or more and 2 or less, the thickness is not particularly limited but preferably in the range of 1.4 mm to 5 mm.

To adjust the ratio of the average spherulite size in a portion which is 700 μm deep inside from the surface of the hollow molded article to the average spherulite size in a portion which is 200 μm deep inside from the surface of the hollow molded article to 1 or more and 2 or less, it is important to control the growth rate of the spherulite size. The growth rate (G) of spherulites under isothermal conditions is known to be expressed by a what-so-called Hoffman-Laurizen equation Equation (1) as described in Journal of Applied Physics 44, 4340(1973):

$$G \propto \beta \ \exp(-K/T(\Delta T)f) \qquad (1)$$

β: Spreading factor
K: Crystal nucleus forming factor
ΔT: Degree of subcooling (melting point—crystallization temperature)
f Correction constant.

In other words, when the crystallization temperature is high, the crystal nucleus forming factor decreases, and the spreading factor that increases with the temperature increases, leading to a progress of growth from one crystal nucleus. As a result, the spherulite size becomes larger. On the other hand, when the crystallization temperature is low, the crystal nucleus forming factor increases and the spreading factor decreases, resulting in inhibited growth from one crystal nucleus. As a result, the spherulite size becomes smaller.

On the other hand, when a hollow molded article is molded, crystallization occurs within a mold during the cooling process. In other words, crystallization occurs under conditions where the temperature changes and the orientation upon the injection is reflected. This crystallization is different from the crystallization described above under isothermal static conditions. The methods of producing a hollow molded article in which the ratio of the average spherulite size in a portion which is 700 μm deep inside from the surface of the hollow molded article to the average spherulite size in a portion which is 200 μm deep inside from the surface of the hollow molded article is 1 or more and 2 or less are not particularly limited as long as such a hollow molded article is obtained. In molding a hollow molded article by injection-molding, one preferred example is a method of molding the hollow molded article with the w/(v/t) of 500 or less when the v is the injection rate (mm/s), the w is the weight of the hollow molded article (g) and the t is the thickness of the hollow molded article (mm). The molding with the w/(v/t) of 450 or less is more preferred and the molding with the w/(v/t) of 400 or less is further preferred. The thickness of the hollow molded article herein indicates the thickness of the thinnest site of the hollow molded article. The weight of the hollow molded article indicates the weight of each split object constituting the hollow molded article.

The v/t is a value obtained by dividing the injection rate by the thickness of the hollow molded article. This value is an index that shows how easily a crystal nucleus is formed because a larger value means increased orientation in the hollow molded article. The w is the weight of the hollow molded article and an index that shows how fast the growth rate of the spherulites is because a larger weight indicates more heat accumulation of the hollow molded article, resulting in the increase in the spreading factor. Thus, when the crystal nuclei are easily formed, the spherulite size is likely to be reduced to a fine size even in the inner layer. On the other hand, when the growth rate of the spherulites is increased, the spherulite size in the inner layer tends to become coarse. That is, by changing the injection rate v (mm/s) according to the size and shape of the hollow molded article and thus controlling the w/(v/t) at 500 or less, the ratio of the average spherulite size in a portion which is 700 μm deep inside from the surface of the hollow molded article to the average spherulite size in a portion which is 200 μm deep inside from the surface of the hollow molded article can be adjusted to 1 or more and 2 or less.

When the hollow molded article is divided into 16 pieces, the standard deviation of the average spherulite size in a portion which is 500 μm deep inside from the surface of each divided hollow molded article piece is preferably 6 or less. When the hollow molded article is divided into 16 pieces, if the standard deviation of the average spherulite size in a portion which is 500 μm deep inside from the surface of each divided hollow molded article piece is larger than 6, the permeation amount of a hydrogen gas and the solution amount of a hydrogen gas in the hollow molded article vary, and as a result, repeated filling of pressurized hydrogen and repeated pressure release tend to cause defects.

When the hollow molded article is divided into 16 pieces, the standard deviation of the average spherulite size in a portion which is 500 μm deep inside from the surface of each divided hollow molded article piece is preferably 4 or less, and more preferably 2 or less because the resulting hollow molded article can prevent defects even when the filling of more pressurized hydrogen and pressure release are repeated. When the hollow molded article is divided into 16 pieces, the standard deviation σ of the average spherulite size in a portion which is 500 μm deep inside from the surface of each divided hollow molded article piece can be determined as follows: an ultrathin section is cut out from a site which is 500 μm deep inside from the surface of each of the 16 divided pieces of the hollow molded article, and each section is observed with a polarizing microscope or a transmission electron microscope to take photos of each spherulite, and a value x (average spherulite size in each site) obtained from the number average of the diameters of individual spherulites calculated by an image analysis device or the like can be used in following equations:

$$\text{Equation(1)}: x = (1/16)\Sigma x_k (k=1 \text{ to } 16) \quad (1)$$

$$\text{Equation(2)}: V = (1/16)\Sigma (x_k - x)^2 (k=1 \text{ to } 16) \quad (2)$$

$$\text{Equation(3)}: \sigma = \sqrt{V} \quad (3)$$

x: The average of the average spherulite sizes in 16 sites
$x_k$: The average spherulite size in each site (μm)
V: The distribution of the average spherulite sizes
σ: The standard deviation.

The method of dividing the hollow molded article into 16 pieces is not particularly limited, but it is preferable to divide the hollow molded article so that each of the divided hollow molded article pieces has the same weight. Examples thereof include a method of dividing the hollow molded article into 16 pieces in the direction perpendicular to the cylinder direction and a method of dividing the hollow molded article into 16 pieces in the direction parallel to the cylinder direction.

When the hollow molded article is divided into 16 pieces and the standard deviation of the average spherulite size in a portion which is 500 μm deep inside from the surface of each divided hollow molded article piece is 6 or less, the thickness of the hollow molded article is not particularly limited, but preferably 1 mm to 5 mm.

To adjust the standard deviation of the average spherulite size in a portion which is 500 μm deep inside from the surface of each of the 16 divided pieces of the hollow molded article to 6 or less, the method is not particularly limited as long as such a hollow molded article is obtained. One example includes a method of, in molding a hollow molded article, controlling the standard deviation of the temperature of the mold surface that touches the resin to 10 or less when the temperature of the mold surface is measured at 10 sites. Molding is more preferably carried out with the standard deviation controlled to 8 or less, and further preferably with the standard deviation controlled to 6 or less. Keeping a uniform temperature of the mold surface that touches the resin can result in a uniform growth rate of the spherulites and thus a uniform average spherulite size. When the temperature of the mold surface which touches the resin is measured at 10 sites, the standard deviation σ is determined by the following equations, using a value x (mold temperature at each site) obtained by measuring at 10 sites the temperature of the mold surface which touches the resin with a thermometer:

$$\text{Equation(1)}: x = (1/16)\Sigma x_k (k=1 \text{ to } 16) \quad (1)$$

$$\text{Equation(2)}: V = (1/16)\Sigma (x_k - x)^2 (k=1 \text{ to } 16) \quad (2)$$

$$\text{Equation(3)}: \sigma = \sqrt{V} \quad (3)$$

x: The average of mold temperatures at 10 sites
$x_k$: The mold temperature at each site (° C.)
V: The distribution of the mold temperatures
σ: The standard deviation.

There are no particular restrictions on the sites when the temperature of the mold surface which touches the resin is measured at 10 sites with a thermometer, but equal intervals between the measurement sites are preferred.

When the temperature of the mold surface that touches the resin is measured at ten sites, the method of adjusting the standard deviation to 10 or less not particularly limited as long as such a temperature range can be controlled. One example method includes a method of using two or more mold temperature controllers to perform molding. In particular, four or more mold temperature controllers are preferably used.

The hollow molded article is preferably composed of a polyamide resin composition. When the hollow molded article is composed of a polyamide resin composition, in the Raman analysis in a portion which is 100 μm deep inside from the surface of the hollow molded article, the intensity ratio of the Raman band derived from crystals in the α form to the Raman band derived from crystals in the γ form (referred to as "crystals in the α form/crystals in the γ form" in some cases) is preferably 2.5 or less. The intensity ratio of the Raman band derived from crystals in the α form to the Raman band derived from crystals in the γ form is an index which indicates the crystal form of the hollow molded article. In the Raman analysis in the portion which is 100 μm deep inside from the surface of the hollow molded article, when the intensity ratio of the Raman band derived from crystals in the α form to the Raman band derived from crystals in the γ form (crystals in the α form/crystals in the γ form) is 2.5 or less, the resulting hollow molded article can prevent permeation of hydrogen gas and the solution of hydrogen into a resin, and can also prevent defects even when the filling of more pressurized hydrogen and pressure release are repeated. In the Raman analysis in the portion which is 100 μm deep inside from the surface of the hollow molded article, the intensity ratio of the Raman band derived from crystals in the α form to the Raman band derived from crystals in the γ form (crystals in the α form/crystals in the γ form) is preferably 2 or less, more preferably 1.5 or less and particularly preferably 1 or less because the resulting hollow molded article can prevent defects even when the filling of more pressurized hydrogen and pressure release are repeated. The lower limit of the intensity ratio (crystals in the α form/crystals in the γ form) is not limited, but usually about 0.01.

The intensity ratio of the Raman band derived from crystals in the α form to the Raman band derived from crystals in the γ form (crystals in the α form/crystals in the γ form) can be determined according to the following method. A test piece is cut out from a site which is 100 μm deep inside from the surface of the hollow molded article and measured with a laser raman spectrometer (in Via, manufactured by Renishaw) in the microscopic mode with the spot diameter of the laser at the position of the specimen being 1 μm. Then, the ratio (crystals in the α form/crystals in the γ form) is determined from the intensity of the Raman band derived from crystals in the α form observed near 1125 $cm^{-1}$ and the intensity of the Raman band derived from crystals in the γ form observed around 1080 $cm^{-1}$.

In the Raman analysis in the portion which is 100 μm deep inside from the surface of the above-mentioned hollow molded article composed of a polyamide resin composition, the methods of adjusting the intensity ratio of the Raman band derived from crystals in the α form to the Raman band derived from crystals in the γ form (crystals in the α form/crystals in the γ form) to 2.5 or less are not particularly limited as long as such a hollow molded article is obtained. In molding a hollow molded article by injection molding, one preferred example is a method of molding the hollow molded article with the w/(v/t) of 400 or less, more preferably of 350 or less, and further more preferably of 300 or less when the v is the injection rate (mm/s), the w is the weight of the hollow molded article (g) and the t is the thickness of the hollow molded article (mm). The thickness of the hollow molded article herein indicates the thickness of the thinnest site of the hollow molded article. The weight of the hollow molded article indicates the weight of each split object constituting the hollow molded article.

The v/t is a value obtained by dividing the injection rate by the thickness of the hollow molded article. This value is an index that shows how easily crystals in the γ form are formed because a larger value means increased orientation inside the hollow molded article. The w is the weight of the hollow molded article and an index that shows how easily the crystals in the γ form are converted into the crystals in the α form which are thermally stable when the weight becomes larger and more heat is accumulated in the hollow molded article. In other words, by changing the injection rate v (mm/s) according to the size and shape of the hollow molded article and thus controlling the w/(v/t) at 400 or less, in the Raman analysis in the portion which is 100 μm deep inside from the surface of the hollow molded article, the intensity ratio of the Raman band derived from crystals in the α form to the Raman band derived from crystals in the γ form (crystals in the α form/crystals in the γ form) can be adjusted to 2.5 or less.

The polyamide resin composition used in the molding of the hollow molded article is preferably a polyamide resin composition obtained by blending 100 parts by weight of a polyamide resin with 0 to 50 parts by weight of other components. In particular, a polyamide resin composition obtained by blending a crystal nucleating agent with a polyamide resin is preferred because the average spherulite size can be easily reduced to a fine size. Further, a polyamide resin composition including a polyamide resin alone and does not include other components may be used.

The polyamide resin is a resin composed of a polymer having an amide bond, and comprising as main raw materials an amino acid, a lactam or a diamine and a dicarboxylic acid. Representative examples of such raw materials include amino acids such as 6-aminocaproic acid, 11-aminoundecanoic acid, 12-aminododecanoic acid, and para-aminomethylbenzoic acid, lactams such as ε-caprolactam and ω-laurolactam, aliphatic, alicyclic and aromatic diamines such as tetramethylene diamine, pentamethylene diamine, hexamethylene diamine, 2-methylpentamethylene diamine, undecamethylene diamine, dodecamethylene diamine, 2,2,4-/2,4,4-trimethylhexamethylene diamine, 5-methylnonamethylene diamine, metaxylene diamine, paraxylylene diamine, 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine, and aliphatic, alicyclic and aromatic dicarboxylic acids such as adipic acid, suberic acid, azelaic acid, sebacic acid, dodecanedioic acid, terephthalic acid, isophthalic acid, 2-chloroterephthalic acid, 2-methylterephthalic acid, 5-methylisophthalic acid, 5-sodiumsulfoisophthalic acid, hexahydroterephthalic acid and hexahydroisophthalic acid. Polyamide homopolymers or copolymers derived from these raw materials can be used either alone or in the form of a mixture. Two or more of such polyamide resins may be blended.

Specific examples of a particularly useful polyamide resins include polycaproamide (polyamide 6), polyhexamethylene adipamide (polyamide 66), polypentamethylene adipamide (polyamide 56), polytetramethylene adipamide (polyamide 46), polyhexamethylene sebacamide (polyamide 610), polypentamethylene sebacamide (polyamide 510), polyhexamethylene dodecamide (polyamide 612), polyundecanamide (polyamide 11), polydodecanamide (polyamide 12), polycaproamide/polyhexamethylene terephthalamide copolymer (polyamide 6/6T), polyhexamethylene adipamide/polyhexamethylene terephthalamide copolymer (polyamide 66/6T), polyhexamethylene adipamide/polyhexamethylene isophthalamide copolymer (polyamide 66/6I), polyhexamethylene adipamide/polyhexamethylene isophthalamide/polycaproamide copolymer (polyamide 66/6I/6), polyhexamethylene terephthalamide/polyhexamethylene isophthalamide copolymer (polyamide 6T/6I), polyhexamethylene terephthalamide/polydodecanamide copolymer (polyamide 6T/12), polyhexamethylene adipamide/polyhexamethylene terephthalamide/polyhexamethylene isophthalamide copolymer (polyamide 66/6T/6I), polyxylylene adipamide (polyamide MXD6), polyhexamethylene terephthalamide/poly-2-methylpentamethylene terephthalamide copolymer (polyamide 6T/M5T), and polyhexamethylene terephthalamide/polypentamethylene terephthalamide copolymer (polyamide 6T/5T) and mixtures or copolymers thereof.

In particular, preferred examples thereof include a polyamide 6 resin, a polyamide 66 resin, a polyamide 610 resin, a polyamide 11 resin, a polyamide 12 resin, a polyamide 6/66 copolymer, a polyamide 6/12 copolymer and the like. Particularly preferred examples thereof include a polyamide 6 resin, a polyamide 66 resin, and a polyamide 610 resin. In practice, these polyamide resins are suitably used as a mixture.

A particularly preferred polyamide resin composition is a polyamide resin composition obtained by blending a polyamide 6 resin (A) and a polyamide resin (C) which has a melting point of 245° C. or less as measured by DSC and has a shorter rise time of the invariant Q than the rise time of the invariant Q of the polyamide 6 resin (A), the rise time of the invariant Q being measured by light scattering upon cooling from a temperature of 250° C. at a rate of 20° C./min, wherein the polyamide resin (C) is blended in an amount of 0.01 to 5 parts by weight with respect to 100 parts by weight of the polyamide 6 resin (A).

The polyamide 6 resin (A) is a polyamide resin comprising as main raw materials 6-aminocaproic acid and/or ε-caprolactam. Other monomers may be copolymerized as long as the desired effect is not impaired. "Comprising as main raw materials" herein means that the total of the unit derived from the 6-aminocaproic acid or the unit derived from ε-caprolactam is 50 mol % or more in a total of 100 mol % of the monomer units constituting the polyamide resin. The unit derived from 6-aminocaproic acid or the unit derived from ε-caprolactam is more preferably 70 mol % or more, and more preferably 90 mol % or more.

Examples of other monomers to be polymerized include amino acids such as 11-aminoundecanoic acid, 12-aminododecanoic acid, and para-aminomethylbenzoic acid, lactams such as ω-laurolactam; aliphatic diamines such as tetramethylene diamine, pentamethylene diamine, hexamethylene diamine, 2-methylpentamethylene diamine, undecamethylene diamine, dodecamethylene diamine, 2,2,4-/2,4,4-trimethylhexamethylene diamine, 5-methylnonamethylene diamine; aromatic diamines such as metaxylene diamine and paraxylylene diamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, dodecanedioic acid; aromatic dicarboxylic acids such as terephthalic acid, isophthalic acid, 2-chloroterephthalic acid, 2-methylterephthalic acid, 5-methylisophthalic acid, 5-sodiumsulfoisophthalic acid, hexahydroterephthalic acid and hexahydroisophthalic acid; alicyclic dicarboxylic acids such as 1,4-cyclohexane dicarboxylic acid, 1,3-cyclohexane dicarboxylic acid, 1,2-cyclohexane dicarboxylic acid, 1,3-cyclopentane dicarboxylic acid. Two or more kinds thereof may be blended.

The polyamide resin (C) is a polyamide resin having a melting point of 245° C. or less as measured by DSC and a shorter rise time of the invariant Q than the rise time of the invariant Q of the polyamide 6 resin (A), the rise time of the invariant Q being measured by light scattering upon cooling from a temperature of 250° C. at a rate of 20° C./min.

The melting point of the polyamide 6 resin (A) and the polyamide resin (C) determined by the DSC measurement can be obtained by the following method. First, using a differential scanning calorimeter (DSC-7 manufactured by PerkinElmer Inc.), two-point calibration (indium, lead) and baseline correction are performed. A sample in an amount of 8 to 10 mg is held for 1 minute at a temperature which is 15° C. higher than the temperature corresponding to the maximum value of the melting curve obtained under conditions of the temperature rise at a heating rate of 20° C./min, and then cooled to 30° C. at a cooling rate of 20° C./min. Further, after the sample is held at a temperature of 30° C. for 1 minute, a second temperature rise step is carried out at a rate of 20° C./min in a similar way to the first temperature rise step. The melting endothermic peak temperature observed in this second temperature rise step is taken as the melting point.

The rise time of the invariant Q of the polyamide 6 resin (A) and the polyamide resin (C) can be obtained by the following method. First, a sample in an amount of 8 to 10 mg is sandwiched between cover glasses and subjected to a hot stage "CSS-450 W" manufactured by Linkam. The sample is held at a temperature of 250° C. for 30 seconds and melted. The sample is then cooled to 180° C. at a rate of 20° C./min. At the same time, using a polymer film dynamics analyzer "DYNA-3000" manufactured by Otsuka Electronics Co., Ltd. under the conditions as follows: the mode: one-dimensional scan (1×512), X direction: integration of four elements in the central portion and count as 1 data, ND filter: 5%, measurement interval: 1 second, exposure time: 500 milliseconds, goniometric angle: 20 degrees, the rise time of the invariant Q is measured with the start of the temperature drop set to 0. The rise time of the invariant Q herein means the moment at which the value of the invariant Q starts to increase when the value of the invariant Q at the start of the temperature drop is 0.

FIG. 1 shows in a graph results of the measurement of the invariant Q of the polyamide 6 resin used in Example 1 as described later. The horizontal axis represents the elapsed time from the start of the temperature drop, and the vertical axis represents the value of the invariant Q. FIG. 1 (b) is an enlarged view of FIG. 1 (a). In FIG. 1 (b), the reference numeral 1 represents the rise time of the invariant Q.

The polyamide resin (C) is not particularly limited as long as it is a polyamide resin in which the melting point and the rise time of the invariant Q satisfy the above conditions, but in general, can be obtained from an amino acid, a lactam or a diamine and a dicarboxylic acid as main raw materials. Representative examples of the raw materials include amino acids such as 6-aminocaproic acid, 11-aminoundecanoic acid, 12-aminododecanoic acid, and para-aminomethylbenzoic acid, lactams such as ε-caprolactam and ω-laurolactam; aliphatic diamines such as tetramethylene diamine, pentamethylene diamine, hexamethylene diamine, 2-methylpentamethylene diamine, undecamethylene diamine, dodecamethylene diamine, 2,2,4-/2,4,4-trimethylhexamethylene diamine, 5-methylnonamethylene diamine; aromatic diamines such as metaxylene diamine and paraxylylene diamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, dodecanedioic acid; aromatic dicarboxylic acids such as terephthalic acid, isophthalic acid, 2-chloroterephthalic acid, 2-methylterephthalic acid, 5-methylisophthalic acid, 5-sodiumsulfoisophthalic acid, hexahydroterephthalic acid and hexahydroisophthalic acid; alicyclic dicarboxylic acids such as 1,4-cyclohexane dicarboxylic acid, 1,3-cyclohexane dicarboxylic acid, 1,2-cyclohexane dicarboxylic acid, 1,3-cyclopentane dicarboxylic acid. A polyamide homopolymer or copolymer derived from these raw materials can be used. Two or more of such polyamide resins may be blended.

Specific examples of the polyamide resin (C) preferably include polyhexamethylene sebacamide (polyamide 610), or a copolymer of one or more selected from polyhexamethylene adipamide (polyamide 66), polypentamethylene adipamide (polyamide 56), polytetramethylene adipamide (polyamide 46) and polytetramethylene sebacamide (polyamide 410) and one or more selected from polycaproamide (polyamide 6), polyundecanamide (polyamide 11), polydodecanamide (polyamide 12), polyhexamethylene sebacamide (polyamide 610), polypentamethylene sebacamide (polyamide 510) and polyhexamethylene dodecamide (polyamide 612). Among them, the polyamide 610 resin is more preferred since the average spherulite size is reduced to a finer size.

The degree of polymerization of the polyamide 6 resin (A) and the polyamide resin (C) is not particularly limited, and the relative viscosity measured at 25° C. in a 98% concentrated sulfuric acid solution having a sample concentration of 0.01 g/ml is preferably 1.5 to 7.0. When the relative viscosity is 1.5 or more, the melt viscosity of the polyamide resin composition during the molding is appropriately high so that the entrainment of air during molding can be suppressed, and formability can be further improved. The relative viscosity is more preferably 1.8 or more. On the other hand, when the relative viscosity is 7.0 or less, the melt viscosity of the polyamide resin composition during the molding is appropriately low, and thus the formability can be further improved.

There are no particular restrictions on the amount of amino terminal groups in the polyamide 6 resin (A) and the polyamide resin (C), but 1.0 to $10.0 \times 10^{-5}$ mol/g is preferred. When the amount of the amino terminal groups is 1.0 to $10.0 \times 10^{-5}$ mol/g, a sufficient degree of polymerization can be obtained, and the mechanical strength of the molded article can be improved. The amount of the amino terminal groups of the polyamide resin is determined by dissolving the polyamide resin in a mixed solvent of phenol and ethanol (83.5:16.5 (volume ratio)), followed by titration with an aqueous solution of 0.02 N hydrochloric acid.

The polyamide resin composition preferably contains a crystal nucleating agent. Examples of crystal nucleating agents include inorganic crystal nucleating agents and organic crystal nucleating agents.

Specific examples of inorganic crystal nucleating agents include talc, kaolinite, montmorillonite, mica, synthetic mica, clay, zeolite, silica, graphite, carbon black, zinc oxide, magnesium oxide, calcium oxide, titanium oxide, calcium sulfide, boron nitride, magnesium carbonate, calcium carbonate, barium sulfate, aluminum oxide, neodymium oxide, metal salts of phenyl phosphonate and the like, and may be used alone or in combination of two or more kinds. These inorganic crystal nucleating agents are preferably modified with an organic substance to improve the dispersibility in the resin composition.

Specific examples of organic crystal nucleating agents include metal salts of organic carboxylic acids such as sodium benzoate, potassium benzoate, lithium benzoate, calcium benzoate, magnesium benzoate, barium benzoate, lithium terephthalate, sodium terephthalate, potassium terephthalate, calcium oxalate, sodium laurate, potassium laurate, sodium myristate, potassium myristate, calcium myristate, sodium octacosanoate, calcium octacosanoate, sodium stearate, potassium stearate, lithium stearate, calcium stearate, magnesium stearate, barium stearate, sodium montanate, calcium montanate, sodium toluate, sodium salicylate, potassium salicylate, zinc salicylate, aluminum dibenzoate, potassium dibenzoate, lithium dibenzoate, sodium β-naphthalate, and sodium cyclohexanecarboxylate, organic sulfonates such as sodium p-toluenesulfonate and sodium sulfoisophthalate, carboxylic acid amides such as stearamide, ethylene bislauramide, palmitamide, hydroxystearamide, erucamide, and trimesic acid tris(t-butylamide), sodium salts or potassium salts (so-called ionomer) of a polymer having a carboxyl group such as a sodium salt of ethylene-acrylic acid or methacrylic acid copolymer and a sodium salt of styrene-maleic anhydride copolymer, benzylidene sorbitol and derivatives thereof, metal salts of phosphorus compounds such as sodium-2,2'-methylenebis (4,6-di-t-butylphenyl)phosphate, and 2,2-methylbis(4,6-di-t-butylphenyl)sodium, amide waxes and the like. One of these can be used alone or two or more kinds can be used. Among them, an amide wax is preferred because the average spherulite size is easily reduced to a finer size.

Examples of the amide waxes include amide compounds obtained by reacting a monocarboxylic acid and a diamine, amide compounds obtained by reacting a monoamine and a polybasic acid, amide compounds obtained by reacting a monocarboxylic acid, a polybasic acid, and a diamine and the like. These can be obtained by a dehydration reaction of corresponding amine and carboxylic acid.

The monoamine is preferably a monoamine having 5 or more carbon atoms, and specific examples thereof include pentylamine, hexylamine, heptylamine, octylamine, nonylamine, decylamine, dodecylamine, stearylamine, cyclohexylamine and benzylamine. Two or more kinds of these may be used in combination. Among them, a higher aliphatic monoamine with the number of carbon atoms of 10 or more and 20 or less is particularly preferred. When the number of carbon atoms is larger than 20, the compatibility with the polyamide resin decreases, resulting in a risk of precipitation.

The monocarboxylic acid is preferably an aliphatic monocarboxylic acid and a hydroxycarboxylic acid having 5 or more carbon atoms. Specific examples thereof include valeric acid, caproic acid, caprylic acid, lauric acid, myristic acid, palmitic acid, stearic acid, oleic acid, linoleic acid, behenic acid, montanic acid, 12-hydroxystearic acid, benzoic acid and the like, and two or more kinds thereof may be used in combination. Among them, a higher aliphatic monocarboxylic acid with the number of carbon atoms of 10 or more and 30 or less is particularly preferred. When the number of carbon atoms is larger than 30, the compatibility with the polyamide 6 resin decreases, resulting in a risk of precipitation.

Specific examples of the diamine include ethylenediamine, 1,3-diaminopropane, 1,4-diaminopropane, tetramethylenediamine, hexamethylenediamine, nonamethylenediamine, undecamethylenediamine, dodecamethylenediamine, metaxylylenediamine, paraxylylenediamine, tolylenediamine, phenylenediamine, isophoronediamine and the like. Two or more kinds of these may be used in combination. Among them, ethylenediamine is particularly suitable.

The polybasic acid is a carboxylic acid having a dibasic acid or higher, and specific examples thereof include aliphatic dicarboxylic acids such as malonic acid, succinic acid, adipic acid, sebacic acid, pimelic acid, and azelaic acid, aromatic dicarboxylic acids such as phthalic acid, terephthalic acid and isophthalic acid, alicyclic dicarboxylic acids such as cyclohexanedicarboxylic acid and cyclohexylsuccinic acid and the like. Two or more kinds of these may be used in combination.

Among them, an amide compound obtained by reacting a higher aliphatic monocarboxylic acid, a polybasic acid and a diamine is particularly suitable. A preferred example thereof includes an amide compound obtained by reacting stearic acid, sebacic acid and ethylenediamine. In this example, the mixing ratio of each component is suitably 0.18 mol to 1.0 mol of the polybasic acid and 1.0 mol to 2.2 mol of the diamine with respect to 2 mol of the higher aliphatic monocarboxylic acid, and further suitably 0.5 mol to 1.0 mol of the polybasic acid and 1.5 mol to 2.0 mol of the diamine with respect to 2 mol of the higher aliphatic monocarboxylic acid.

In the polyamide resin composition which forms the hollow molded article, the amount of the crystal nucleating agent to be blended is, based on 100 parts by weight of the polyamide resin, preferably 0.01 to 10 parts by weight. Likewise, when an amide wax is used as the crystal nucleating agent, 0.01 to 10 parts by weight of the amide wax is preferably blended with respect to 100 parts by weight of the polyamide resin.

Examples of other components which are contained in the polyamide resin composition forming the hollow molded article include thermoplastic resins other than polyamide resins, various additives, impact modifiers, fillers, and the like.

Examples of the thermoplastic resins other than the polyamide resins include polyester resins, polyphenylene sulfide resins, polyphenylene oxide resins, polycarbonate resins, polylactic acid resins, polyacetal resins, polysulfone resins, tetrafluorinated polyethylene resins, polyetherimide resins, polyamide imide resins, polyimide resins, polyether sulfone resins, polyether ketone resins, polythioether ketone resins, polyether ether ketone resins, styrene resins such as polystyrene resins and ABS resins, polyalkylene oxide resins and the like. Two or more kinds of such thermoplastic resins can be blended.

Examples of various additives include coloration inhibitors, antioxidants such as hindered phenols and hindered amines, release agents such as ethylene bisstearylamide and higher fatty acid esters, copper compounds, plasticizers, thermal stabilizers, lubricants, ultraviolet inhibitors, colorants, flame retardants, foaming agents and the like.

Examples of the impact modifiers include olefinic resins, acrylic rubbers, silicone rubbers, fluorine rubbers, styrene rubbers, nitrile rubbers, vinyl rubbers, urethane rubbers, polyamide elastomers, polyester elastomers, ionomers and the like. Two or more kinds thereof may be blended.

Among these, olefinic resins are preferably used because of their excellent impact resistance. The olefinic resin is a thermoplastic resin obtained by polymerizing olefin monomers such as ethylene, propylene, butene, isoprene, pentene and the like. The olefinic resin may be a copolymer of two or more kinds of olefin monomers or a copolymer of one of these olefin monomers and another monomer. Specific examples of the olefinic resins include polymers such as polyethylene, polypropylene, polystyrene, poly 1-butene, poly 1-pentene, polymethylpentene and the like or copolymers thereof; ethylene/α-olefin copolymers, ethylene/α,β-unsaturated carboxylic acid ester copolymers, α-olefin/α,β-unsaturated carboxylic acid ester copolymers, polyolefins obtained by hydrolysis of at least a part of [a copolymer of (ethylene and/or propylene) and vinyl alcohol ester], copolymers of (ethylene and/or propylene) and (unsaturated carboxylic acid and/or unsaturated carboxylic acid ester), polyolefins obtained by replacing by a metal at least a part of the carboxyl group of [a copolymer of (ethylene and/or propylene) and (an unsaturated carboxylic acid and/or an unsaturated carboxylic acid ester)] to form a metal salt, block copolymers of a conjugated diene and a vinyl aromatic hydrocarbon or hydrogenation products thereof and the like. Among these, ethylene/α-olefin copolymers and ethylene/α,β-unsaturated carboxylic acid ester copolymers are more preferred, and ethylene/α-olefin copolymers are further preferred.

Further, the polyolefin resins may be modified with an unsaturated carboxylic acid and/or a derivative thereof. The derivative of an unsaturated carboxylic acid is a compound obtained by substituting the hydroxy group portion of the carboxyl group of the unsaturated carboxylic acid with another substituent. Examples thereof include metal salts of unsaturated carboxylic acids, acid halides, esters, acid anhydrides, amides, imides and the like. Examples of the unsaturated carboxylic acids or derivatives thereof include acrylic acid, methacrylic acid, maleic acid, fumaric acid, itaconic acid, crotonic acid, methylmaleic acid, methylfumaric acid, mesaconic acid, citraconic acid, glutaconic acid and metal salts of these carboxylic acids; unsaturated carboxylic acid esters such as methyl hydrogen maleate, methyl hydrogen itaconate, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate and the like; acid anhydrides such as maleic anhydride, itaconic anhydride, citraconic anhydride, endobicyclo-(2,2,1)-5-heptene-2,3-dicarboxylic acid, endobicyclo-(2,2,1)-5-heptene-2,3-dicarboxylic anhydride and the like; maleimide, N-ethyl maleimide, N-butyl maleimide, N-phenyl maleimide, glycidyl acrylate, glycidyl methacrylate, glycidyl ethacrylate, glycidyl itaconate, glycidyl citraconate, 5-norbornene-2,3-dicarboxylic acid and the like. Among them, unsaturated dicarboxylic acids and acid anhydrides thereof are preferred, and maleic acid or maleic anhydride is particularly preferred.

The filler may be a fibrous filler or a non-fibrous filler, or a combination of a fibrous filler and a non-fibrous filler may be used. Examples of fibrous fillers include glass fibers, glass milled fibers, carbon fibers, potassium titanate whiskers, zinc oxide whiskers, aluminum borate whiskers, aramid fibers, alumina fibers, silicon carbide fibers, ceramic fibers, asbestos fibers, gypsum fibers, metal fibers and the like. Examples of non-fibrous fillers include silicates such as wollastonite, zeolite, sericite, kaolin, mica, clay, pyrophyllite, bentonite, asbestos, talc, alumina silicate; metal oxides such as alumina, silicon oxide, magnesium oxide, zirconium oxide, titanium oxide and iron oxide; metal carbonates such as calcium carbonate, magnesium carbonate and dolomite; metal sulfates such as calcium sulfate and barium sulfate; metal hydroxide such as magnesium hydroxide, calcium hydroxide, aluminum hydroxide; glass beads, ceramic beads, boron nitride, silicon carbide and the like. They may be hollow. In addition, these fibrous and/or non-fibrous fillers are preferably pretreated with a coupling agent before use to obtain superior mechanical properties. Examples of coupling agents include isocyanate compounds, organosilane compounds, organic titanate compounds, organoborane compounds, epoxy compounds and the like.

A method of producing a hollow molded article will be explained below.

Examples of methods of molding two or more split objects constituting the hollow molded article include extrusion molding, injection molding, compression molding and the like. Among them, extrusion molding and injection molding are preferred. The resulting two or more split objects which constitute the hollow molded article may be welded by plastic welding to obtain the hollow molded article. When a hollow molded article having a cylindrical shape is formed, examples of methods include, but not limited to, a method in which two molded objects each having a shape corresponding to the hollow molded article which is divided in half vertically in the direction perpendicular to the height of the cylinder are welded by plastic welding to form a hollow molded article, a method in which two molded objects each having a shape corresponding to the hollow molded article divided in half transversely in a horizontal direction with respect to the height of the cylinder are welded by plastic welding to form a hollow molded article, a method in which two plates having a semicircular shape, an elliptical shape or the like that block the both ends of the hollow molded article and a cylinder-shaped body portion are welded by plastic welding to form a hollow molded article and the like.

Examples of plastic welding include hot plate welding, infrared-ray welding and infrared-ray/vibration welding in which vibration welding is carried out after a welded portion is warmed by infrared rays. In particular, the infrared-ray welding and the infrared-ray/vibration welding are preferred. On the other hand, ultrasonic welding is unsuitable for hollow molded articles larger than or equal to an approximative size of a business card. In laser welding, vibration welding, and spin welding, the strength of the welded portion is insufficient, and cracks are likely to occur in the welded portion when pressurized hydrogen is repeatedly filled and pressure is repeatedly released.

By virtue of the excellent characteristic that cracks in the welded portion can be prevented even when the filling of pressurized hydrogen and pressure release are repeated, the hollow molded article is used as a hollow molded article which has a welded portion and which comes into contact with pressurized hydrogen. The hollow molded article having a welded portion and comes into contact with pressurized hydrogen refers to a hollow molded article having a welded portion and comes into contact with hydrogen at a normal pressure or more. Since the effect of preventing cracks in the welded portion when the filling of pressurized hydrogen and pressure release are repeated is achieved, the hollow molded article is preferably used for a hollow molded article having a welded portion and comes into contact with hydrogen at a pressure of 20 MPa or more and more preferably used for a hollow molded article which has a welded portion and which comes into contact with hydrogen at a pressure of 30 MPa or more. For the upper limit of the pressure for use, the hollow molded article is preferably used for a hollow molded article having a welded portion and comes into contact with hydrogen at a pressure of 200 MPa or less, more preferably used for a hollow molded article having a welded portion and comes into contact with hydrogen at a pressure of 150 MPa or less, and further preferably used for a hollow molded article having a welded portion and comes into contact with hydrogen at a pressure of 100 MPa or less. Examples of the hollow molded article having a welded portion and comes into contact with pressurized hydrogen include a tank for pressurized hydrogen, a tank liner for pressurized hydrogen and the like. Among these, a tank liner for pressurized hydrogen can be preferably used.

Particularly preferably, a hollow molded article having a welded portion and comes into contact with pressurized hydrogen is used as a resin liner of a tank for pressurized hydrogen reinforced with a carbon fiber reinforced resin on the outside of the resin liner. That is, the hollow molded article can be used as a tank for pressurized hydrogen in which a carbon fiber reinforced resin (CFRP) reinforcing layer is laminated on the surface layer of the hollow molded article.

The CFRP reinforcing layer is preferably laminated on the surface layer of the tank liner because the strength and elastic modulus capable of withstanding high pressure can be achieved. The CFRP reinforcing layer comprises a carbon fiber and a matrix resin. From the viewpoints of bending characteristics and the strength, the carbon fibers preferably have a tensile and elastic modulus of 50 to 700 GPa per single carbon fiber, and more preferably of 200 to 700 GPa when specific rigidity is also considered, and the most preferably of 200 to 450 GPa when cost efficiency is further considered. The tensile strength of a single carbon fiber is preferably 1500 to 7000 MPa and is preferably 3000 to 7000 MPa from the viewpoint of specific strength. The density of carbon fibers is preferably 1.60 to 3.00, more preferably 1.70 to 2.00 from the viewpoint of the weight reduction, and the most preferably 1.70 to 1.90 from the viewpoint of cost efficiency. Further, the fiber diameter of carbon fibers is preferably 5 to 30 μm per fiber, more preferably 5 to 20 μm from the viewpoint of handling property, and the most preferably 5 to 10 μm from the viewpoint of the weight reduction. Carbon fibers may be used alone or in combination with reinforcing fibers other than carbon fibers. Examples of reinforcing fibers other than the carbon fibers include glass fibers and aramid fibers. Further, when the ratio of the carbon fibers to the matrix resin is defined by the volume fraction Vf of the carbon fibers in the carbon fiber reinforced resin reinforcing layer material, the Vf is preferably 20 to 80% from the viewpoint of rigidity, and preferably 40 to 80% from the viewpoint of productivity and required rigidity.

The matrix resin constituting the CFRP reinforcing layer may be a thermosetting resin or a thermoplastic resin. When the matrix resin is a thermosetting resin, examples of the main materials include epoxy resins, unsaturated polyester resins, vinyl ester resins, phenol resins, polyurethane resins, silicone resins and the like. One of these may be used alone, or a mixture of two or more kinds thereof may be used. Epoxy resins are particularly preferred. Examples of the epoxy resins include bisphenol A epoxy resins, bisphenol F epoxy resins, bisphenol S epoxy resins, phenol novolak epoxy resins, isocyanate modified bisphenol A epoxy resins and the like. When a thermosetting resin is employed in the matrix resin, a suitable curing agent or reaction accelerator can be added to the thermosetting resin component.

When the matrix resin is a thermoplastic resin, examples of the main materials thereof include polyethylene resins, polypropylene resins, polyvinyl chloride resins, ABS resins, polystyrene resins, AS resins, polyamide resins, polyacetal resins, polycarbonate resins, thermoplastic polyester resins, PPS resins, fluorine resins, polyether imide resins, polyether ketone resins, polyimide resins and the like. These thermoplastic resins may be used alone, as a mixture of two or more, or as a copolymer. In a mixture, a compatibilizing agent may be used in combination. In addition, a brominated flame retardant, a silicon flame retardant, red phosphorus or the like may be added as a flame retardant.

Examples of methods of laminating the CFRP reinforcing layer on the surface layer of the tank liner for pressurized hydrogen include known methods such as a filament winding (hereinafter referred to as FW) method, a tape winding (hereinafter referred to as TW) method, a sheet winding (hereinafter referred to as SW), a hand lay-up method, and an RTM (Resin Transfer Molding) method. Among these molding methods, molding may be carried out by a single method or a combination of two or more molding methods. A method selected from the FW method, the TW method, and the SW method is preferred from the viewpoints of exhibition of properties as well as productivity and formability. Basically, these FW method, SW method and TW method are the same molding method in an aspect that a matrix resin is added to strand-shaped carbon fibers and the resulting product is laminated on a liner. The names differ according to the winding form of the carbon fibers on the liner: a filament (thread) form, a tape (a tape shape in which threads are bundled to some extent), and a sheet (a sheet shape in which the tapes are bundled to some extent). Although the most basic FW method is described in detail, it is also applicable to the TW method and the SW method.

In the FW method, when the matrix resin is a thermosetting resin, it is possible to wind the carbon fibers to which a resin has been already coated (uncured) directly around the liner or apply the resin to the carbon fibers immediately before the winding around the liner. In these examples, after winding the carbon fibers and uncured matrix resin on the liner to cure the resin, it is necessary to perform a resin curing treatment under conditions suitable for the resin used in a batch furnace (oven), a continuous curing oven or the like.

In the FW method, when the matrix resin is a thermoplastic resin, it is possible to form a tank shape for pressurized hydrogen by winding carbon fibers coated (impregnated) with a resin in advance directly around the liner. In this example, immediately before the winding around the liner, it is necessary to raise the temperature of the carbon fibers coated with resin to a temperature higher than or equal to the melting point of the thermoplastic resin. It is also possible to apply a melted thermoplastic resin to the carbon fibers just before the winding around the liner. In this example, a resin curing step applied in a thermosetting resin is unnecessary.

When a tank for pressurized hydrogen is obtained by the above FW method, TW method, SW method or the like, the design of the fiber orientation design of the carbon fibers is the most important. In the FW method, the TW method, and the SW method, molding is performed by winding around a liner a carbon fiber strand (continuous fibers), a prepreg which is a carbon fiber strand impregnated with a resin beforehand, or the like. At the time of designing, design factors such as the continuous fiber direction and the lamination thickness in the body portion of the liner are preferably chosen to satisfy the rigidity and strength which achieve the required characteristics.

As a tank for pressurized hydrogen, a tank liner in which a valve is fixed by insert molding or by an O ring is preferred. Fixation of the valve by insert molding or by an O ring is preferred because the gas tightness of pressurized hydrogen is increased. The valve herein serves as a filling port or a discharging port for pressurized hydrogen. Examples of materials of the metal part used as the valve are carbon steel, manganese steel, chromium molybdenum steel, stainless steel, aluminum alloys and the like. Examples of carbon steel include carbon steel pipes for pressure piping, carbon steel pipes for high pressure piping, steel pipes for low temperature piping, and carbon steel materials for mechanical structures. Examples of manganese steel include seamless steel pipes for high pressure gas containers, manganese steel materials for mechanical structures, and manganese chromium steel materials. Examples of chromium molybdenum steel and low alloy steel include seamless steel pipes for high pressure gas containers, alloy steel pipes for mechanical structures, nickel chromium molybdenum steel materials, and chromium molybdenum steel materials. Examples of stainless steel include stainless steel forged steep products for pressure, stainless steel pipes for piping, stainless steel bars, hot rolled stainless steel plates and steel strips, and cold rolled stainless steel plates and steel strips. Examples of aluminum alloys include aluminum and aluminum alloy plates, strips, bars, lines, seamless pipes, and forged products. In addition, materials subjected to annealing and normalizing for carbon steel, normalizing and quenching and tempering for manganese steel, quenching and tempering for chromium molybdenum steel and low alloy steel, a solution heat treatment for stainless steel, and quenching and tempering for aluminum alloys may be applied. Further, aluminum alloys subjected to a solution treatment and a T6 aging treatment may be applied.

Most preferably, the tank for pressurized hydrogen is obtained by laminating a CFRP reinforcing layer on the surface layer of a tank liner composed of the polyamide resin composition and by fixing a valve to the tank liner by insert molding or by an O ring.

EXAMPLES

The desired effects will be described in detail below by way of Examples. This disclosure is not limited to the following Examples. The evaluation in each Example and Comparative Example was carried out by the following methods.

(1) Properties of Repeated Filling of Pressurized Hydrogen and Repeated Pressure Release (Cracks of the Welded Portion)

An X-ray CT analysis was performed on the hollow molded article obtained in each Example and Comparative Example, and the presence or absence of cracks in the welded portion was observed. A crack-free hollow molded article was placed in an autoclave, and then a hydrogen gas was injected into the autoclave until the pressure reached 30 MPa over a period of 3 minutes. After the hollow molded article was held for 2 hours, the pressure was decreased to a normal pressure over 1 minute. This process was counted as one cycle, and 700 cycles were performed repeatedly. The X-ray CT analysis was performed on the hollow molded article after the repetition of 700 cycles, and the presence or absence of cracks of 1 mm or more in the welded portion was observed.

(2) Properties of Repeated Filling of Pressurized Hydrogen and Repeated Pressure Release (Defects)

An X-ray CT analysis was performed on the hollow molded articles obtained in Examples 10 to 32 and Comparative Examples 6 to 9, and the presence or absence of defects was observed. A crack-free hollow molded article was placed in an autoclave, and then a hydrogen gas was injected into the autoclave until the pressure reached 30 MPa over a period of 3 minutes. After the hollow molded article was held for 2 hours, the pressure was decreased to a normal pressure over 1 minute. This process was counted as one cycle, and 700 cycles were performed repeatedly. The X-ray CT analysis was performed on the hollow molded article after the repetition of 700 cycles, and the presence or absence of defects of 10 μm or more was observed.

(3) Retention Ratio of the Tensile Strength in the Welded Portion

From the hollow molded article (thickness 3 mm) obtained in each Example and Comparative Example, five test pieces with a height of 100 mm and a width of 10 mm were cut out so that the site welded by plastic welding would be at the center in the height direction and perpendicular to the height direction, and other five test pieces with a height of 100 mm and a width of 10 mm not including the site welded by plastic welding were cut out so that the tensile test could be carried out in the same direction as the test pieces including the site welded by plastic welding. After the humidity adjustment under conditions of the temperature of 23° C. and the humidity of 50% for 30 minutes, the tensile test was conducted at a rate of 10 mm/min, and the tensile strength was evaluated. The tensile strength was taken as the average value measured for 5 pieces for each, and the retention ratio of the tensile strength in the welded portion was calculated from the obtained tensile strength results.

Tensile strength retention ratio in the welded portion=(tensile strength of the test piece including the site welded by plastic welding)/(tensile strength of the test piece not including the site welded by plastic welding)×100

(4) The Average Spherulite Size in a Portion which is 500 μm Deep Inside from the Surface of the Hollow Molded Article (Average Spherulite Size)

Using an ultramicrotome, ultrathin sections were cut out from the portion which is 500 μm deep inside from the surface of the hollow molded article obtained in each Example and Comparative Example, and photos of spherulites of the ultrathin sections were taken with a polarizing optical microscope. Using the image analysis apparatus, the diameters of 50 or more spherulites on the photos were measured, and the average spherulite size was calculated as the number average value.

(5) The Ratio of the (Inner Layer) Average Spherulite Size in a Portion which is 700 μm Deep Inside from the Surface of the Hollow Molded Article/the (Outer Layer) Average Spherulite Size in a Portion which is 200 μm Deep Inside from the Surface of the Hollow Molded Article (the Ratio of the Inner Layer/Outer Layer of the Hollow Molded Article)

Using an ultramicrotome, ultrathin sections were cut out from the portion which is 700 μm deep inside from the surface of the hollow molded articles obtained in Examples 10 to 21 and Comparative Examples 6 and 7, and photos of spherulites of the ultrathin sections were taken with a polarizing optical microscope. Using the image analysis apparatus, the diameters of 50 or more spherulites on the photos were measured, and the average spherulite size was calculated as the number average value. Using an ultramicrotome, ultrathin sections were cut out from the portion which is 200 μm deep inside from the surface of the hollow molded article obtained in each Example and Comparative Example, and photos of spherulites of the ultrathin sections were taken with a polarizing optical microscope. Using the image analysis apparatus, the diameters of 50 or more spherulites were measured on the photos, and the average spherulite size was calculated as the number average value. The ratio was calculated from the calculated average spherulite size in a portion which is 700 μm deep inside from the surface of the hollow molded article and the calculated average spherulite size in a portion which is 200 μm deep inside from the surface of the hollow molded article.

(6) The Standard Deviation of the Average Spherulite Size in a Portion which is 500 μm Deep Inside from the Surface of the Hollow Molded Article (Standard Deviation of the Average Spherulite Size)

The hollow molded articles obtained in Examples 22 to 32 and Comparative Examples 8 and 9 were divided in 16 pieces in a direction parallel to the height direction of the cylinder such that the circle of the cylinder section would be divided in 16 equal pieces. Using an ultramicrotome, ultrathin sections were cut out from the portion which is 500 μm deep inside from the surface of each resulting hollow molded article piece, and photos of spherulites of each ultrathin section were taken with a polarizing optical microscope. Using the image analysis apparatus, the average spherulite size at each site was calculated as the number average value of the diameter of each spherulite. From the obtained average spherulite size x of each hollow molded article piece, the standard deviation σ was calculated according to the following equations:

$$\text{Equation}(1): x = (1/16)\Sigma x_k (k=1 \text{ to } 16) \quad (1)$$

$$\text{Equation}(2): V = (1/16)\Sigma (x_k - x)^2 (k=1 \text{ to } 16) \quad (2)$$

$$\text{Equation}(3): \sigma = \sqrt{V} \quad (3)$$

x: The average of the average spherulite sizes in 16 sites
$x_k$: The average spherulite size in each site (μm)
V: The distribution of the average spherulite sizes
σ: The standard deviation.

(7) The Intensity Ratio of the Raman Band Derived from Crystals in the α Form to the Raman Band Derived from Crystals in the γ Form in the Portion which is 100 μm Deep Inside from the Surface of the Hollow Molded Article (Crystals in the α Form/Crystals in the γ Form)

Test pieces were cut out from the portion which 100 μm deep inside from the surface of the hollow molded articles obtained in Examples 10 to 21 and Comparative Examples 6 and 7 and were measured with a laser raman spectrometer (in Via, manufactured by Renishaw) in the microscopic mode with the spot diameter of the laser at the position of the specimen being 1 μm. The intensity of the Raman band derived from the crystals in the α form observed in the vicinity of 1125 $cm^{-1}$ and the intensity of the Raman band derived from the crystals in the γ form observed in the vicinity of 1080 $cm^{-1}$ were measured to calculate the intensity ratio (crystals in the α form/crystals in the γ form). Detailed conditions are shown below:
Apparatus: in Via manufactured by Renishaw
Conditions: Measurement mode; Microscope Raman
Objective lens: ×100
Beam diameter: 1 μm
Light source: YAG 2nd 532 nm
Laser power: 50 mW
Diffraction grating: Single 3000 gr/mm
Slit: 65 μm
Detector: CCD/RENISHAW 1024×256.

The same measurement was performed on the test pieces which were cut out and then treated thermally at 150° C. for 1 hour. Before and after the heat treatment, the intensity ratio of the Raman band derived from crystals in the α form to the Raman band derived from crystals in the γ form (crystals in the α form/crystals in the γ form) was confirmed to be the same.

(8) Melting Point and Cooling Crystallization Temperature

For the polyamide 6 resin (A) and the polyamide resin (C) blended in each Example and Comparative Example, a differential scanning calorimeter (DSC-7 manufactured by Perkin Elmer Co.) was used for the two-point calibration (indium, lead) and baseline correction. Then, a sample in an amount of 8 to 10 mg was held for 1 minute at a temperature which was 15° C. higher than the temperature corresponding to the maximum value of the melting curve obtained under conditions of the temperature rise at a heating rate of 20° C./min and then cooled to 30° C. at a cooling rate of 20° C./min. Further, after the sample was maintained at 30° C. for 1 minute, a second temperature rise step was carried out at a rate of 20° C./min. The melting endothermic peak temperature observed in this second temperature rise step was taken as the melting point.

(9) Rise Time of the Invariant Q in Light Scattering Measurement

For the polyamide 6 resin (A) and the polyamide resin (C) blended in each Example and Comparative Example, a sample in an amount of 8 to 10 mg was sandwiched between cover glasses and subjected to a hot stage "CSS-450 W" manufactured by Linkam. The sample was held at a temperature of 250° C. for 30 seconds and melted. The sample was then cooled to 180° C. at a rate of 20° C./min. At the same time, using a polymer film dynamics analyzer "DYNA-3000" manufactured by Otsuka Electronics Co., Ltd. under the conditions as follows: the mode: one-dimensional scan (1×512), X direction: integration of four elements in the central portion and count as 1 data, ND filter: 5%, measurement interval: 1 second, exposure time: 500 milliseconds, goniometric angle: 20 degrees, the rise time of the invariant Q was measured with start of the temperature drop set to 0.

Raw materials and abbreviations used in Each example and Comparative Example are shown below:
(A) Polyamide 6 Resin
PA6: polyamide 6 resin (melting point of 223° C., relative viscosity at 25° C. in a 98% concentrated sulfuric acid solution having a resin concentration of 0.01 g/ml is 2.70, the rise time of the invariant Q is 175 seconds)
(C) Polyamide Resin
PA610: polyamide 610 resin (melting point of 226° C., relative viscosity at 25° C. in a 98% concentrated sulfuric acid solution having a resin concentration of 0.01 g/ml is 3.50, the rise time of the invariant Q is 165 seconds)
PA6/PA66 copolymer: polyamide 6 resin/polyamide 66 resin copolymer (melting point of 190° C., cooling crystallization temperature: 122° C., relative viscosity at 25° C. in a 98% concentrated sulfuric acid solution having a resin concentration of 0.01 g/ml is 4.20)
(B) Amide Wax
Amide wax: ethylene diamine stearic acid. sebacic acid polycondensate ["Right Amide" WH-255"] (manufactured by Kyoeisha Chemical Co., Ltd., melting point of 255° C.)
Inorganic nucleating agent: Micro Talc ["NanoAce" (registered trademark) D-600] (manufactured by Nippon Talc Co., Ltd., median diameter (D50) of 0.5 μm)

Impact modifier 1: maleic anhydride modified ethylene/1-butene copolymer ["TAFMER" (registered trademark) MH 7020] (manufactured by Mitsui Chemicals, Inc.).

Impact modifier 2: maleic anhydride modified ethylene/1-butene copolymer ["TAFMER" (registered trademark) MH 5040] (manufactured by Mitsui Chemicals, Inc.).

Example 1

Each raw material described in Table 1 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following conditions: a cylinder temperature of 250° C., an injection rate of 60 mm/sec, a cooling time of 150 seconds, a holding pressure of 20 MPa, a pressure-holding time of 10 seconds, and the mold surface was cooled by a flow of a cooling medium of 30° C. and 10 seconds after the resin was shaped, heated by a flow of a heating medium of 80° C. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Table 1.

Examples 2 to 4, 7 to 9, Comparative Examples 1 and 5

Each raw material described in Table 1 and Table 2 was fed into a twin-screw extruder (TEX 30α-35 BW-7 V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., a mold temperature of 80° C., an injection rate of 60 mm/sec, a holding pressure of 20 MPa, a pressure-holding time of 10 seconds, and a cooling time of 150 seconds. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Tables 1 and 2.

Example 5

Each raw material described in Table 1 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided, and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with mold clamping force of 1000 t, under the following molding conditions: a cylinder temperature of 250° C., a mold temperature of 80° C., an injection rate of 60 mm/sec, a holding pressure of 20 MPa, a pressure-holding time of 10 seconds, and a cooling time of 150 seconds. Two of the cylindrical molded articles thus obtained were arranged such that the flat portions would be parallel. After the flat portions were heated for 90 seconds by infrared rays, two cylindrical molded articles were pressurized and welded (infrared-ray welding) so that the penetration amount would be 2 mm, and a hollow molded article having a welded portion was thus obtained. The obtained hollow molded article was evaluated by the methods described above. The results are shown in Table 1.

Example 6

Each raw material described in Table 1 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with mold clamping force of 1000 t, under the following conditions: a cylinder temperature of 250° C., a mold temperature of 80° C., an injection rate of 60 mm/sec, a holding pressure of 20 MPa, a pressure-holding time of 10 seconds, and a cooling time of 150 seconds. Two of the cylindrical molded articles thus obtained were arranged such that the flat portions would be parallel. After the flat portions were heated on a hot plate at a temperature of 280° C., two cylindrical molded articles were pressurized and welded (hot plate welding) so that the penetration amount would be 2 mm, and a hollow molded article having a welded portion was thus obtained. The obtained hollow molded article was evaluated by the methods described above. The results are shown in Table 1.

Comparative Example 2

Each raw material described in Table 2 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., a mold temperature of 80° C., an injection rate of 60 mm/sec, a holding pressure of 20 MPa, a pressure-holding time of 10 seconds, and a cooling time of 150 seconds. Two of the cylindrical molded articles thus obtained were arranged such that the flat portions would be parallel. Then the two cylindrical molded articles were vibrated and welded (vibration welding) so that the penetration amount would be 2 mm, and a hollow molded article having a welded portion was thus obtained. The obtained hollow molded article was evaluated by the methods described above. The results are shown in Table 2.

Comparative Example 3

Each raw material described in Table 2 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided, and a screw rotation speed was 150 rpm, and melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., a mold temperature of 80° C., an injection rate of 60 mm/sec, a holding pressure of 20 MPa, a pressure-holding time of 10 seconds, and a cooling time of 150 seconds. Two of the cylindrical molded articles thus obtained were arranged such that the flat portions would be parallel. Then the two cylindrical molded articles were rotated and welded (spin welding) so that the penetration amount would be 2 mm, and a hollow molded article having a welded portion was thus obtained. The obtained hollow molded article was evaluated by the methods described above. The results are shown in Table 2.

Comparative Example 4

Each raw material described in Table 2 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided, and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles for the side of the laser beam transmission having a diameter of 500 mm, a height of 400 mm and a thickness of 3 mm were injection-molded, using an injection molding machine with a mold clamping force of 1000 t, under the following molding conditions: a cylinder temperature of 250° C., a mold temperature of 80° C., an injection rate of 60 mm/sec, a holding pressure of 20 MPa, a pressure-holding time of 10 seconds, and a cooling time of 150 seconds. A material prepared by blending 0.4 parts by weight of carbon black with 100 parts by weight of the obtained pellets was used to injection-mold cylindrical molded articles for the side of the laser beam absorption having a diameter of 500 mm, a height of 400 mm and a thickness of 3 mm, using an injection molding machine with a mold clamping force of 1000 t, under the following molding conditions: a cylinder temperature of 250° C., a mold temperature of 80° C., an injection rate of 60 mm/sec, a holding pressure of 20 MPa, a pressure-holding time of 10 seconds, and a cooling time of 150 seconds. One of the resulting cylindrical molded articles for the side of the laser beam transmission and one of the resulting cylindrical molded articles for the side of the laser beam absorption were arranged such that the flat portions would be parallel. Then the two cylindrical molded articles were irradiated with a laser beam and welded (laser welding) so that the penetration amount would be 2 mm, and a hollow molded article having a welded portion was thus obtained. The obtained hollow molded article was evaluated by the methods described above. The results are shown in Table 2.

TABLE 1

| | | | Example 1 | Example 2 | Example 3 | Example 4 |
|---|---|---|---|---|---|---|
| Composition | PA6 | Parts by weight | 100 | 100 | 100 | 100 |
| | PA610 | Parts by weight | — | — | — | 3 |

TABLE 1-continued

|  |  |  |  |  |  |  |
|---|---|---|---|---|---|---|
|  | Amide wax | Parts by weight | — | 1 | 3 | — |
|  | Impact modifier 1 | Parts by weight | — | — | — | — |
| Evaluation results | Plastic welding method | — | Infrared-ray/ vibration | Infrared-ray/ vibration | Infrared-ray/ vibration | Infrared-ray/ vibration |
|  | Mold cooling and heating | — | Yes | No | No | No |
|  | Cracks in the welded portion | — | Absent | Absent | Absent | Absent |
|  | Average spherulite size | μm | 17 | 6 | 3 | 8 |
|  | Tensile strength retention ratio in the welded portion | % | 95 | 97 | 98 | 96 |

|  |  |  | Example 5 | Example 6 | Example 7 | Example 8 | Example 9 |
|---|---|---|---|---|---|---|---|
| Composition | PA6 | Parts by weight | 100 | 100 | 100 | 100 | 100 |
|  | PA610 | Parts by weight | 3 | 3 | 3 | — | 3 |
|  | Amide wax | Parts by weight | — | — | 1 | 1 | — |
|  | Impact modifier 1 | Parts by weight | — | — | — | 17.5 | 17.5 |
| Evaluation results | Plastic welding method | — | Infrared-ray | Hot plate | Infrared-ray/ vibration | Infrared-ray/ vibration | Infrared-ray/ vibration |
|  | Mold cooling and heating | — | No | No | No | No | No |
|  | Cracks in the welded portion | — | Absent | Absent | Absent | Absent | Absent |
|  | Average spherulite size | μm | 8 | 8 | 2 | 4 | 6 |
|  | Tensile strength retention ratio in the welded portion | % | 95 | 85 | 100 | 99 | 97 |

TABLE 2

|  |  |  | Comparative Example 1 | Comparative Example 2 | Comparative Example 3 | Comparative Example 4 | Comparative Example 5 |
|---|---|---|---|---|---|---|---|
| Composition | PA6 | Parts by weight | 100 | 100 | 100 | 100 | 100 |
|  | PA610 | Parts by weight | — | 3 | 3 | 3 | — |
|  | PA6/PA66 copolymer | Parts by weight | — | — | — | — | 32 |
|  | Impact modifier 1 | Parts by weight | — | — | — | — | 28 |
| Evaluation results | Plastic welding method | — | Infrared-ray/ vibration | Vibration | Spin welding | Laser welding | Infrared-ray/ vibration |
|  | Mold cooling and heating | — | No | No | No | No | No |
|  | Cracks in the welded portion | — | Present | Present | Present | Present | Present |
|  | Average spherulite size | μm | 25 | 8 | 8 | 8 | 24 |
|  | Tensile strength retention ratio in the welded portion | % | 91 | 75 | 70 | 78 | 85 |

From the above results, in a hollow molded article having a welded portion, we confirmed that, when the average spherulite size in the portion which is 500 μm deep inside from the surface of the hollow molded article is 20 μm or less and when the tensile strength at a site where two or more split objects are welded by plastic welding is 80% or more of the tensile strength of a site other than the site welded by plastic welding, it is possible for the first time to obtain a hollow molded article which is capable of preventing cracks at the welded portion even when pressurized hydrogen is repeatedly filled and pressure is repeatedly released.

Example 10

Each raw material described in Table 3 was fed into a twin-screw extruder (TEX 30α-35 BW-7 V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, to verify the weight of the hollow molded article, a cylindrical molded article having a diameter of 500 mm, a height of 400 mm and a thickness of 3 mm was injection-molded, using an injection molding machine with a mold clamping force of 1000 t, under the following molding conditions: a cylinder temperature of 250° C., a cooling time of 150 seconds, a holding pressure of 20 MPa, a pressure-holding time of 10 seconds, a mold temperature of 80° C., and an injection rate of 30 mm/sec. The weight of the resulting cylindrical molded article was measured.

Then, from the obtained pellets, to obtain cylindrical molded articles forming the hollow molded article, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., a cooling time of 150 seconds, a holding pressure of 20 MPa, a pressure-holding time of 10 seconds, the mold surface was cooled by a flow of a cooling medium of 30° C. and 10 seconds after the resin was shaped, heated by a flow of a heating medium of 80° C., and an injection rate v (mm/s) was set such that the w/(v/t) would be 500 or less when the weight w (g) and the thickness t (mm) were measured for the cylindrical molded articles. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Table 3.

Examples 11 to 18, Comparative Examples 6 and 7

Each raw material described in Table 3 and Table 4 was fed into a twin-screw extruder (TEX 30α-35 BW-7 V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, to verify the weight of the hollow molded article, a cylindrical molded article having a diameter of 500 mm, a height of 400 mm and a thickness of 3 mm was injection-molded, using an injection molding machine with mold clamping force of 1000 t, under the following molding conditions: a cylinder temperature of 250° C., a cooling time of 150 seconds, a holding pressure of 20 MPa, a pressure-holding time of 10 seconds, a mold temperature of 80° C., and an injection rate of 30 mm/sec. The weight of the resulting cylindrical molded article was measured.

Then, from the obtained pellets, to obtain cylindrical molded articles forming the hollow molded article, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., a mold temperature of 80° C., a cooling time of 150 seconds, a holding pressure of 20 MPa, a pressure-holding time of 10 seconds, and an injection rate v (mm/s) was set such that the w/(v/t) would be 500 or less when the weight w (g) and the thickness t (mm) were measured for the cylindrical molded articles. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Tables 3 and 4.

Examples 19 to 21

Each raw material described in Table 3 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided, and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, to verify the weight of the hollow molded article, a cylindrical molded article having a diameter of 500 mm, a height of 400 mm and a thickness of 3 mm was injection-molded, using an injection molding machine with a mold clamping force of 1000 t, under the following molding conditions: a cylinder temperature of 250° C., a cooling time of 150 seconds, a holding pressure of 20 MPa, a pressure-holding time of 10 seconds, a mold temperature of 80° C., and an injection rate of 30 mm/sec. The weight of the resulting cylindrical molded article was measured.

Then, from the obtained pellets, to obtain cylindrical molded articles forming the hollow molded article, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., a mold temperature of 80° C., a cooling time of 360 seconds, a holding pressure of 20 MPa, a pressure-holding time of 10 seconds, and an injection rate v (mm/s) was set such a way that the w/(v/t) would be 500 or more when the weight w (g) and the thickness t (mm) were measured for the cylindrical molded articles. Two of the cylindrical molded articles thus obtained were arranged such a way that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Table 3.

TABLE 3

| | | | Example 10 | Example 11 | Example 12 | Example 13 | Example 14 |
|---|---|---|---|---|---|---|---|
| Composition | PA6 | Parts by weight | 100 | 100 | 100 | 100 | 100 |
| | PA610 | Parts by weight | — | — | — | 3 | 3 |
| | Amide wax | Parts by weight | — | 1 | 3 | — | — |
| | Inorganic nucleating agent | Parts by weight | — | — | — | — | — |
| | Impact modifier 1 | Parts by weight | — | — | — | — | — |
| | Impact modifier 2 | Parts by weight | — | — | — | — | — |
| Evaluation results | Molding method | — | Injection molding + welding | Injection molding + welding | Injection molding + welding | Injection molding + welding | Injection molding + welding |
| | Mold cooling and heating | — | Yes | No | No | No | No |
| | Weight of cylindrical molded article | g | 2100 | 2110 | 2120 | 2090 | 2090 |
| | w/(v/t) | — | 105 | 106 | 106 | 105 | 313 |
| | Cooling time during molding | Seconds | 150 | 150 | 150 | 150 | 150 |

TABLE 3-continued

|  |  |  |  |  |  |  |  |
|---|---|---|---|---|---|---|---|
|  | Defects | — | Absent | Absent | Absent | Absent | Absent |
|  | Average spherulite size | μm | 17 | 6 | 3 | 8 | 10 |
|  | Ratio of the inner layer/ outer layer of the hollow molded article | — | 1.9 | 1.5 | 1.4 | 1.6 | 1.8 |
|  | Intensity ratio of Raman bands (crystals in the α form/crystals in the γ form) | — | 2.2 | 1.3 | 0.6 | 0.9 | 1.6 |
|  | Cracks in the welded portion | — | Absent | Absent | Absent | Absent | Absent |
|  | Tensile strength retention ratio in the welded portion | % | 95 | 97 | 98 | 96 | 94 |

|  |  |  | Example 15 | Example 16 | Example 17 | Example 18 | Example 19 | Example 20 | Example 21 |
|---|---|---|---|---|---|---|---|---|---|
| Composition | PA6 | Parts by weight | 100 | 100 | 100 | 100 | 100 | 100 | 100 |
|  | PA610 | Parts by weight | 3 | — | 3 | 3 | 3 | — | — |
|  | Amide wax | Parts by weight | 1 | 1 | 1 | 1 | — | — | — |
|  | Inorganic nucleating agent | Parts by weight | — | — | — | — | — | 3 | 3 |
|  | Impact modifier 1 | Parts by weight | — | 17.5 | 17.5 | — | — | — | 11 |
|  | Impact modifier 2 | Parts by weight | — | — | — | 17.5 | — | — | — |
| Evaluation Results | Molding method | — | Injection molding + welding | Injection molding + welding | Injection molding + welding | Injection molding + welding | Injection molding + welding | Injection molding + welding | Injection molding + welding |
|  | Mold cooling and heating | — | No | No | No | No | No | No | No |
|  | Weight of cylindrical molded article | g | 2100 | 2010 | 2000 | 2000 | 2090 | 2120 | 2050 |
|  | w/(v/t) | — | 105 | 101 | 100 | 100 | 627 | 636 | 615 |
|  | Cooling time during molding | Seconds | 150 | 150 | 150 | 150 | 360 | 360 | 360 |
|  | Defects | — | Absent | Absent | Absent | Absent | Present | Present | Present |
|  | Average spherulite size | μm | 2 | 4 | 6 | 4 | 12 | 13 | 13 |
|  | Ratio of the inner layer/outer layer of the hollow molded article | — | 1.2 | 1.4 | 1.3 | 1.3 | 2.1 | 2.3 | 2.2 |
|  | Intensity ratio of Raman bands (crystals in the α form/crystals in the γ form) | — | 0.7 | 1.1 | 0.6 | 0.5 | 2.8 | 3.0 | 2.9 |
|  | Cracks in the welded portion | — | Absent | Absent | Absent | Absent | Absent | Absent | Absent |
|  | Tensile strength retention ratio in the welded portion | % | 100 | 99 | 100 | 100 | 91 | 85 | 86 |

TABLE 4

|  |  |  | Comparative Example 6 | Comparative Example 7 |
|---|---|---|---|---|
| Composition | PA6 | Parts by weight | 100 | 100 |
|  | PA610 | Parts by weight | — | — |
|  | PA6/PA66 copolymer | Parts by weight | — | 32 |
|  | Inorganic nucleating agent | Parts by weight | — | — |
|  | Impact modifier 1 | Parts by weight | — | 28 |
| Evaluation results | Molding method | — | Injection molding + welding | Injection molding + welding |
|  | Mold cooling and heating | — | No | No |
|  | Weight of cylindrical molded article w/(v/t) | g | 2100 / 105 | 1990 / 100 |
|  | Cooling time during molding | Seconds | 150 | 150 |
|  | Defects | — | Present | Present |
|  | Average spherulite size | μm | 25 | 24 |
|  | Ratio of the inner layer/outer layer of the hollow molded article | — | 1.9 | 1.9 |
|  | Intensity ratio of Raman bands (crystals in the α form/crystals in the γ form) | — | 2.4 | 2.3 |
|  | Cracks in the welded portion | — | Present | Present |
|  | Tensile strength retention ratio in the welded portion | % | 91 | 85 |

From the above results, in a hollow molded article having a welded portion, we confirmed that, when the average spherulite size in the portion which is 500 μm deep inside from the surface of the hollow molded article is 20 μm or less and when the tensile strength at a site where two or more split objects are welded by plastic welding is 80% or more of the tensile strength of a site other than the site welded by plastic welding, it is possible for the first time to obtain a hollow molded article which is capable of preventing cracks at the welded portion even when pressurized hydrogen is repeatedly filled and pressure is repeatedly released. Furthermore, we found that, when the ratio of the average spherulite size in a portion which is 700 μm deep inside from the surface of the hollow molded article to the average spherulite size in a portion which is 200 μm deep inside from the surface of the hollow molded article is 1 or more and 2 or less, it is possible for the first time to obtain a hollow molded article which can prevent defects even when pressurized hydrogen is repeatedly filled and pressure is repeatedly released.

Example 22

Each raw material described in Table 5 was fed into a twin-screw extruder (TEX 30α-35 BW-7 V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following conditions: a cylinder temperature of 250° C., an injection rate of 60 mm/sec, a cooling time of 150 seconds, a holding pressure of 20 MPa, a pressure-holding time of 10 seconds, and the mold was set at 30° C. using two mold temperature controllers and controlled such that the standard deviation of the temperature of the mold surface touching the resin would be 6.4 when the temperature of the mold surface was measured at 10 sites, and 10 seconds after the resin was shaped, heated by a flow of a heating medium of 80° C. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Table 5.

Examples 23 to 25, 27 to 29, Comparative Examples 8 and 9

Each raw material described in Table 5 and Table 6 was fed into a twin-screw extruder (TEX 30α-35 BW-7 V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., an injection rate of 60 mm/sec, a holding pressure of 20 MPa, a pressure-holding time of 10 seconds, a cooling time of 150 seconds, and the mold was set at 80° C. using two mold temperature controllers and controlled such that the standard deviation of the temperature of the mold surface touching the resin would be 5.2 when the temperature of the mold surface was measured at 10 sites. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Tables 5 and 6.

Example 26

Each raw material described in Table 5 was fed into a twin-screw extruder (TEX 30α-35 BW-7 V manufactured by JSW Corporation) (L/D=45 (L herein is the length from the raw material supply port to the discharge port, and D is the screw diameter)) in which a cylinder temperature was set at 240° C., a screw arrangement of one kneading zone provided and a screw rotation speed was 150 rpm, and was melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., an injection rate of 60 mm/sec, a holding pressure of 20 MPa, a pressure-holding time of 10 seconds, a cooling time of 150 seconds, and the mold was set at 80° C. using four mold temperature controllers and controlled such that the standard deviation of the temperature of the mold surface touching the resin would be 3.3 when the temperature of the mold surface was measured at 10 sites. Two of the cylindrical molded articles thus obtained were arranged such that the flat portions would be parallel. After the flat portions were heated for 60 seconds by infrared rays, the two cylindrical molded articles were vibrated and welded (infrared-ray/vibration welding) so that the penetration amount would be 2 mm, and a hollow molded article having a welded portion was thus obtained. The obtained hollow molded article was evaluated by the methods described above. The results are shown in Table 5.

Examples 30 to 32

Each raw material described in Table 5 was fed into a twin-screw extruder (TEX30α-35BW-7V manufactured by JSW Corporation) (L/D=45 (L herein is the length from the raw material supply port to the discharge port, and D is the screw diameter)) in which a cylinder temperature was set at 240° C., a screw arrangement of one kneading zone provided, and a screw rotation speed was 150 rpm, and was welded (infrared-ray/vibration welding) so that the penetration amount would be 2 mm, and a hollow molded article having a welded portion was thus obtained. The obtained hollow molded article was evaluated by the methods described above. The results are shown in Table 5.

TABLE 5

| | | | Example 22 | Example 23 | Example 24 | Example 25 | Example 26 |
|---|---|---|---|---|---|---|---|
| Composition | PA6 | Parts by weight | 100 | 100 | 100 | 100 | 100 |
| | PA610 | Parts by weight | — | — | — | 3 | 3 |
| | Amide wax | Parts by weight | — | 1 | 3 | — | — |
| | Inorganic nucleating agent | Parts by weight | — | — | — | — | — |
| | Impact modifier 1 | Parts by weight | — | — | — | — | — |
| Evaluation results | Molding method | — | Injection molding + welding | Injection molding + welding | Injection molding + welding | Injection molding + welding | Injection molding + welding |
| | Mold cooling and heating | — | Yes | No | No | No | No |
| | The number of mold temperature controllers | Mold temperature controllers | 2 | 2 | 2 | 2 | 4 |
| | Defects | — | Absent | Absent | Absent | Absent | Absent |
| | Average spherulite size | μm | 17 | 6 | 3 | 8 | 5 |
| | Standard deviation of the average spherulite size | — | 4.5 | 3 | 1.8 | 2.5 | 1.9 |
| | Cracks in the welded portion | — | Absent | Absent | Absent | Absent | Absent |
| | Tensile strength retention ratio in the welded portion | % | 95 | 97 | 98 | 96 | 98 |

| | | | Example 27 | Example 28 | Example 29 | Example 30 | Example 31 | Example 32 |
|---|---|---|---|---|---|---|---|---|
| Composition | PA6 | Parts by weight | 100 | 100 | 100 | 100 | 100 | 100 |
| | PA610 | Parts by weight | 3 | — | 3 | 3 | — | — |
| | Amide wax | Parts by weight | 1 | 1 | 1 | — | — | — |
| | Inorganic nucleating agent | Parts by weight | — | — | — | — | 3 | 3 |
| | Impact modifier 1 | Parts by weight | — | 17.5 | 17.5 | — | — | 11 |
| Evaluation results | Molding method | — | Injection molding + welding | Injection molding + welding | Injection molding + welding | Injection molding + welding | Injection molding + welding | Injection molding + welding |
| | Mold cooling and heating | — | No | No | No | No | No | No |
| | The number of mold temperature controllers | Mold temperature controllers | 2 | 2 | 2 | 1 | 1 | 1 |
| | Defects | — | Absent | Absent | Absent | Present | Present | Present |
| | Average spherulite size | μm | 2 | 4 | 6 | 12 | 14 | 13 |
| | Standard deviation of the average spherulite size | — | 1.6 | 2.5 | 1.5 | 6.5 | 6.8 | 6.7 |
| | Cracks in the welded portion | — | Absent | Absent | Absent | Absent | Absent | Absent |
| | Tensile strength retention ratio in the welded portion | % | 100 | 99 | 100 | 91 | 85 | 86 | melt-kneaded. The gut discharged from the die at a rate of 20 kg/h was rapidly cooled by passing through a cooling bath filled with water conditioned at 10° C. for 10 seconds, then pelletized with a strand cutter to obtain pellets. The obtained pellets were dried in a vacuum at a temperature of 80° C. for 12 hours in a vacuum drier, and thus dried pellets were obtained. From the obtained pellets, cylindrical molded articles having a diameter of 500 mm, a height of 400 mm and a thickness of 3 mm were injection-molded, using an injection molding machine with a mold clamping force of 1000 t, under the following molding conditions: a cylinder temperature of 250° C., an injection rate of 60 mm/sec, a holding pressure of 20 MPa, a pressure-holding time of 10 seconds, a cooling time of 150 seconds, and the mold was set at 80° C. using one mold temperature controllers and controlled such that the standard deviation of the temperature of the mold surface touching the resin would be 11.2 when the temperature of the mold surface was measured at 10 sites. Two of the cylindrical molded articles thus obtained were arranged such that the flat portions would be parallel. After the flat portions were heated for 60 seconds by infrared rays, the two cylindrical molded articles were vibrated and

TABLE 6

| | | | Comparative Example 8 | Comparative Example 9 |
|---|---|---|---|---|
| Composition | PA6 | Parts by weight | 100 | 100 |
| | PA610 | Parts by weight | — | — |
| | PA6/PA66 copolymer | Parts by weight | — | 32 |
| | Inorganic nucleating agent | Parts by weight | — | — |
| | Impact modifier 1 | Parts by weight | — | 28 |
| Evaluation results | Molding method | — | Injection molding + welding | Injection molding + welding |
| | Mold cooling and heating | — | No | No |
| | The number of mold temperature controllers | Mold temperature controllers | 2 | 2 |

TABLE 6-continued

|  |  | Comparative Example 8 | Comparative Example 9 |
|---|---|---|---|
| Defects |  | Present | Present |
| Average spherulite size | μm | 25 | 24 |
| Standard deviation of the average spherulite size | — | 5.2 | 4.8 |
| Cracks in the welded portion | — | Present | Present |
| Tensile strength retention ratio in the welded portion | % | 91 | 85 |

From the above results, in a hollow molded article having a welded portion, we confirmed that, when the average spherulite size in the portion which is 500 μm deep inside from the surface of the hollow molded article is 20 μm or less and when the tensile strength at a site where two or more split objects are welded by plastic welding is 80% or more of the tensile strength of a site other than the site welded by plastic welding, it is possible for the first time to obtain a hollow molded article which is capable of preventing cracks at the welded portion even when pressurized hydrogen is repeatedly filled and pressure is repeatedly released. Furthermore, we found that, when the standard deviation of the average spherulite size in a portion which is 500 μm deep inside from each surface of the hollow molded article divided into 16 pieces is 6 or less, it is possible for the first time to obtain a hollow molded article which can prevent defects even when pressurized hydrogen is repeatedly filled and pressure is repeatedly released.

INDUSTRIAL APPLICABILITY

The hollow molded article is extremely useful as a hollow molded article which has a welded portion and which comes into contact with pressurized hydrogen because cracks in the welded portion can be prevented even when the filling of pressurized hydrogen and pressure release are repeated.

The invention claimed is:

1. A hollow molded article having a joining site where two or more split objects are welded by plastic welding and comes into contact with pressurized hydrogen,
wherein said hollow molded article is composed of a polyamide resin composition,
said the polyamide resin composition is obtained by blending 0.01 to 10 parts by weight of an amide wax (B) with 100 parts by weight of a polyamide 6 resin (A),
said the amide wax (B) is an amide compound obtained by reacting a higher aliphatic monocarboxylic acid, a polybasic acid and a diamine,
said plastic welding is a welding method selected from the group consisting of infrared-ray welding and infrared-ray/vibration welding in which vibration welding is carried out after a welded portion is warmed by infrared rays,
an average spherulite size in a portion which is 500 μm deep inside from a surface of said hollow molded article is 20 μm or less, and a tensile strength of a test piece containing said joining site of said hollow molded article is 90% or more based on a tensile strength of a test piece not containing said joining site of said hollow molded article, and the tensile strength of a test piece containing said joining site of said hollow molded article and the tensile strength of a test piece not containing said joining site of said hollow molded article is measured by:
welding two or more split objects by plastic welding, a rectangular test piece is cut out from the hollow molded article, a test piece with a short side of 10 mm is prepared such that the joining site welded by plastic welding is positioned at a center in a direction of a long side and perpendicularly to the direction of the long side of the test piece, the tensile strength of a test piece not containing said joining site by plastic welding, a rectangular test piece not containing a site welded by plastic welding and having a short side of 10 mm is prepared such that a tensile test on the hollow molded article can be performed in a same tensile direction as in the tensile test of a test piece of the hollow molded article containing the joining site welded by plastic welding, and after a humidity adjustment under conditions of 23° C./50% RH for 30 minutes, the test pieces are measured for the tensile strength at a tensile speed of 10 mm/min and confirmed.

2. The hollow molded article according to claim 1, wherein a ratio of the average spherulite size in a portion which is 700 μm deep inside from the surface of said hollow molded article to an average spherulite size in a portion which is 200 μm deep inside from the surface of said hollow molded article is 1 or more and 2 or less.

3. The hollow molded article according to claim 2, wherein a standard deviation of the average spherulite size in a portion which is 500 μm deep inside from the surface of each hollow molded article is 6 or less when said hollow molded article is divided into 16 pieces.

4. The hollow molded article according to claim 1, wherein a standard deviation of the average spherulite size in a portion which is 500 μm deep inside from the surface of each hollow molded article is 6 or less when said hollow molded article is divided into 16 pieces.

5. The hollow molded article according to claim 1, wherein an intensity ratio of a Raman band derived from crystals in α form to a Raman band derived from crystals in γ form is 2.5 or less in a Raman analysis of a portion which is 100 μm deep inside from the surface of said hollow molded article.

6. The hollow molded article according to claim 5, wherein said polyamide resin composition is a polyamide resin composition obtained by blending a polyamide 6 resin (A) and a polyamide resin (C) having a melting point of 245° C. or less as measured by DSC and has a shorter rise time of the invariant Q than the rise time of the invariant Q of the polyamide 6 resin (A), said rise time of the invariant Q being measured by light scattering upon cooling from a temperature of 250° C. at a rate of 20° C./min, and said polyamide resin (C) is blended in an amount of 0.01 to 5 parts by weight with respect to 100 parts by weight of said polyamide 6 resin (A).

7. The hollow molded article according to claim 1, wherein said polyamide resin composition is a polyamide resin composition obtained by blending a polyamide 6 resin (A) and a polyamide resin (C) having a melting point of 245° C. or less as measured by DSC and has a shorter rise time of the invariant Q than the rise time of the invariant Q of the polyamide 6 resin (A), said rise time of the invariant Q being measured by light scattering upon cooling from a temperature of 250° C. at a rate of 20° C./min, and said polyamide resin (C) is blended in an amount of 0.01 to 5 parts by weight with respect to 100 parts by weight of said polyamide 6 resin (A).

8. The hollow molded article according to claim 1, wherein the welding method is infrared-ray welding.

* * * * *